United States Patent [19]
Fishman

[11] Patent Number: 6,112,133
[45] Date of Patent: Aug. 29, 2000

[54] VISUAL SYSTEM AND METHOD FOR GENERATING A CNC PROGRAM FOR MACHINING PARTS WITH PLANAR AND CURVILINEAR SURFACES

[75] Inventor: Lena Fishman, Maple Glen, Pa.

[73] Assignee: IMCS, Inc., Maple Glen, Pa.

[21] Appl. No.: 09/187,573

[22] Filed: Nov. 5, 1998

Related U.S. Application Data

[60] Provisional application No. 60/076,261, Feb. 27, 1998.

[51] Int. Cl.[7] .............................. G06F 19/00; G06F 17/00; G06F 7/00; G06F 15/02; G06F 15/04

[52] U.S. Cl. ........................ 700/182; 700/180; 708/130; 707/104

[58] Field of Search .............................. 364/192, 474.22, 364/474.21, 474.15, 474.2; 700/87, 180, 179, 173, 177, 178, 182; 708/130; 707/104

[56] References Cited

U.S. PATENT DOCUMENTS

| | | | |
|---|---|---|---|
| Re. 36,422 | 11/1999 | Pazel ...................................... | 707/104 |
| 4,521,860 | 6/1985 | Kanematsu et al. ..................... | 700/184 |
| 4,530,046 | 7/1985 | Munekata et al. ........................ | 700/86 |
| 4,660,148 | 4/1987 | Kishi et al. .............................. | 700/182 |
| 4,697,240 | 9/1987 | Cedar et al. ............................. | 700/160 |
| 4,761,783 | 8/1988 | Christensen et al. ................... | 714/763 |
| 4,907,164 | 3/1990 | Guyder .................................... | 700/173 |
| 4,992,948 | 2/1991 | Pilland et al. ........................... | 700/173 |
| 5,245,544 | 9/1993 | Yamamoto et al. ..................... | 700/180 |
| 5,266,876 | 11/1993 | Ito et al. ............................. | 318/568.24 |
| 5,313,402 | 5/1994 | Ito ........................................... | 700/181 |
| 5,363,308 | 11/1994 | Guyder .................................... | 700/187 |
| 5,377,117 | 12/1994 | Yamamoto .............................. | 700/180 |
| 5,510,995 | 4/1996 | Oliver ...................................... | 700/182 |
| 5,526,273 | 6/1996 | Borsari et al. ........................... | 700/180 |
| 5,537,326 | 7/1996 | Fish ......................................... | 700/182 |
| 5,544,149 | 8/1996 | Katayama et al. ................... | 369/275.3 |
| 5,576,946 | 11/1996 | Bender et al. ............................ | 700/17 |
| 5,595,463 | 1/1997 | Takegahara et al. .................... | 409/132 |
| 5,680,523 | 10/1997 | Watkins et al. ......................... | 345/419 |
| 5,724,264 | 3/1998 | Rosenberg et al. ..................... | 702/152 |
| 5,796,618 | 8/1998 | Maeda et al. ............................ | 700/182 |
| 5,818,721 | 10/1998 | Funahashi ............................... | 700/182 |
| 5,870,306 | 2/1999 | Harada .................................... | 700/169 |
| 5,894,418 | 4/1999 | Sato et al. ............................... | 700/173 |
| 5,903,474 | 5/1999 | Sadler et al. .............................. | 700/28 |
| 5,933,353 | 8/1999 | Abriam et al. .......................... | 700/182 |
| 5,995,987 | 11/1999 | Iida et al. ................................ | 708/130 |

OTHER PUBLICATIONS

Modern Machine Shop Magazine Mar. 1996 by Gardner Publications, Inc.

*Primary Examiner*—William Grant
*Assistant Examiner*—Ivan Calcaño
*Attorney, Agent, or Firm*—Seidel, Gonda Lavorgna & Monaco, PC

[57] ABSTRACT

The present invention comprises a system and method for generating a CNC program for machining a part having planar and curvilinear surfaces and surfaces of revolution comprising an interface for inputting part information including for at least one face corresponding to at least one surface of the part and having face information comprising a boundary, an orientation, and a type of machining function corresponding to the face. A set of features corresponding to each face is also input via the interface. Thereafter a set of machining operations to machine the set of features is generated. The machining operations are optimized to achieve a minimum process time to machine the part.

9 Claims, 14 Drawing Sheets

| PartMaker - Process Table | | | | | | | | | |
|---|---|---|---|---|---|---|---|---|---|
| Proc. No. | Tool ID | Tool No. | Tool Name | Proc. Task | Group | Face | Feed | Speed | Sync Time |
| 1 | T004 | 4 | End Mill_0.5 | Contour Rough | 1 | End View | 5.6upm | 929rpm | 2.98 |
| 2 | T004 | 4 | End Mill_0.5 | Contour Finish | 1 | End View | 5.6upm | 929rpm | 1.50 |
| 3 | T002 | 2 | End Mill_0.25 Z tc | Pocket Rough | 2 | End View | 2.5upm | 1248rpm | 0.63 |
| 4 | T025 | 25 | DoveTail Z tool | Pocket Finish | 2 | End View | 30.7upm | 2429rpm | 0.10 |
| 5 | T001 | 1 | OD TURN | OD_Turn | 1 | Side View | 0.011 upr | 166fpm | 1.68 |
| 6 | T003 | 3 | GROOVING TOC | OD_Groove | 2 | Side View | 0.002upr | 30fpm | 8.33 |
| 7 | T003 | 3 | GROOVING TOC | DRILL | 1 | DRILL H( | 9.5upm | 5000rpm | 0.10 |
| 8 | T004 | 4 | End Mill_0.5 | DEEP HOLE | 1 | DRIL H( | upm2.8 | 929rpm | 0.50 |
| 9 | T005 | 5 | End Mill0.125 Z tc | Contour Finish | 2 | DRILL H( | 1.2upm | 1248rpm | 1.49 |
| 10 | T006 | 6 | End Mill 0.25 X tc | Contour Rough | 1 | Cyl Mill L | 2.5upm | 1248rpm | 5.33 |
| 11 | T027 | 27 | Drill_0.33 | DRILL | 1 | Mill Diam | 24.8upm | 3215rpm | 0.20 |

Material File: IRON_GRC.MDB  Total 9min): 25.09

FIG. 11

```
PartMaker - PART.TXT
%
:12
N3G0G90G92X0Y0Z0
N4M06T4
N5X 1.225Y 1.005S929M3
N6G43Z20H4
N7T2
N8Z0.05
N9G1Z-0.25F2.777
N10G41D1X0.96Y0.74F5.554
N11G3X0.85Y0.47510.265J-0.265
N12G1Y-0.475
N13G2X0.475Y-0.851-0.375J0.
N14G1X-0.475
N15G2X-0.85Y-0.47510.J0.375
N16G1Y0.475
N17G2X-0.475Y0.8510.375J0.
N18G1X0.475
N19G2X0.85Y0.47510.J-0.375
N20G3X0.96Y0.2110.375J0.
N21G1G40X1.225Y-0.055
N22G0Z0.1
N23Y1.005
N24Z-0.2
N25G1Z-0.5F2777
N26G41D1X0.96Y0.74F5.554
N27G3X0.85Y0.47510.265J-0.265
N28G1Y-0.475
N29G2X0.475Y-0.851-0.375J0.
N30G1X-0.475
N31G2X-0.85Y-0.47510.J0.375
N32G1Y0.475
N38G0Z0.1
N39Z0.1
N40Y1.005
N41Z0.05
N42G1Z-0.5F2777
N43G41D1X0.96Y0.74F5.554
N44G3X0.85Y0.47510.265J-0.265
N45G1Y-0.475
N46G2X0.475Y-0.851-0.375J0.
N47G1X-0.475
N48G2X-0.85Y-0.47510.J0.375
N49G1Y0.475
N50G2X-0.475Y0.8510.375J0.
```

FIG. 12

VISUAL SYSTEM AND METHOD FOR GENERATING A CNC PROGRAM FOR MACHINING PARTS WITH PLANAR AND CURVILINEAR SURFACES

This application claims the benefit of U.S. Provisional Application Ser. No. 60/076,261 filed Feb. 27, 1998.

FIELD OF THE INVENTION

The present invention relates to a system and method for automatically generating a computer numerical control (CNC) machine program for machining parts with multiple planar and/or curvilinear surfaces. More particularly, it relates to a system and method for generating a CNC program by representing a complex, tooling intensive part as a plurality of simple planar and curvilinear faces and related elementary features (such as, for example, holes, slots, and pockets) of these faces.

BACKGROUND OF THE INVENTION

CNC machines cut material from a workpiece to produce a specific part using a plurality of cutting tools in a sequence of machining operations. The CNC machine moves the tools and the workpiece in three-dimensional space in a pre-determined path, facilitating their interaction and resultant material removal. The examples of CNC machine tools shown in FIGS. 1a, 1b, 2 and 3 are more accurate and productive than manual machines.

A computer supervises the motion of the CNC machine by executing commands of a CNC program. These commands define the tool to be used, the tool's cutting feed and rotational speed information, and describe a tool path necessary to remove material for a given operation. The CNC machines recognize special languages that differ from one brand of machine to another. The languages of the CNC machines are typically cumbersome for humans and are not user friendly.

Computer Aided Manufacturing (CAM) software systems simplify the process of generating the CNC program in some cases. CAM systems accept graphic design input in an interactive manner, and often in a 3D solid model form. Traditional CAM systems grew out of Computer Aided Design (CAD) and Computer Aided Engineering (CAE) systems. The focus of CAD and CAE is on the functionality and properties of the entire part. In this context, solid modeling is essential to investigate various properties of the materials, e.g., such as heat distribution or deformation under stress.

In contrast to design and engineering applications, a machining application is essentially a surfacing process. Often only a small segment of the entire part surface is machined. As an example, only the mating surfaces of metal cast parts are machined, leaving most of the surface in rough form. The machinist is interested only in the surfaces on which he has to work and the relationship between these surfaces. Although the global coordinates of all the part elements are known in the solid model produced for the design and engineering application, for a machining operation the operator is required to create a local coordinate system for each surface that requires machining. This procedure is difficult and labor intensive for a machine tool operator.

A typical machine part includes of one or more surfaces wherein each surface may contain multiple standard mechanical features, e.g., holes, slots, pockets, grooves, or threads. A mechanical drawing of the part contains sufficient information about the geometrical shape, the features, and the material of the part to define the part. The features are typically referenced to a surface on which they are located. Each surface is drawn as a separate view of the part. The surfaces may be planar or curvilinear surfaces created by a milling procedure or a curvilinear surface or a surface of revolution created by a turning procedure. Machining the features involves using a large number of cutting tools and setting machining parameters for every operation. For example, a simple tapped hole may require a minimum four tools: center drill, drill, tap, and chamfering tool. Numerous parameters such as speed, feed rate, and depth of cut might be required for each operation. In order to optimize the manufacturing process, the sequence of machine operations may have to be changed from the order in which the data were initially entered. Cost effective production dictates minimizing time invested in generating a validated CNC program and maximizing tool and equipment utilization. Expert knowledge is essential in organizing an efficient production process.

Since the tools and sequence of operations for a CNC program in most CAM systems are a function of the machine's capabilities and the operator's practices (which differ from one machine shop to another), they are usually defined by the operators. Therefore, while traditional CAM systems provide assistance in tool path calculations for jobs with sculptured and free machine surfaces, they do not offer much help for machining parts with many distinct features that require using a large number of tools.

One way to simplify entry of tooling information is described in U.S. Pat. No. 4,521,860 to Kanematsu et al. This patent discloses a special CNC computer that allows entry of three modes of operation connected to specific keys on a front panel. Each mode contains a pre-determined number of operation units such as hole drilling and tapping, slot milling, or pocket milling. The units allow entry of a combination of geometrical and tooling information that can be reused. Establishing hard rules for entering machine data into predefined units allows the computer to reuse the information within the confines of one surface of a part.

In addition, there are CAM systems for programming planar (two-dimensional) milling machines that include automated CNC program generators for tooling intensive parts produced on CNC drilling, boring, or planar milling machines. These systems have the capability of subtly capturing the operator's expertise in machining part features on a flat surface and reapplying this knowledge to machining the same or similar features on the same or different parts. To further simplify the program preparation process, the system allows the operator to identify several planar surfaces on a part, program each surface separately, and then generate one CNC program for the entire part.

CNC Milling Machines and Machine Centers, shown for example in FIG. 1A, are used for producing essentially flat or sculptured surfaces and for machining features (such as holes, slots, and pockets) on these surfaces. In this system, the workpiece moves in a linear fashion, while the cutting tool simply rotates. Relative to the cutting tool, the part moves in the X-, Y-, and Z-directions. Multi-Axis Machining Centers, shown for example in FIG. 1b, allow tilt to A-, B-, C-angles around X-, Y-, and Z-axes, respectively. Simpler machines, like CNC drills and bores, cut material only on one axis.

A CNC lathe (CNC Turning Machine), shown for example in FIG. 2, produces parts having curvilinear inner and outer surfaces of revolution, e.g., solid or hollow cylinders, cones, semi-spheres, and parts with surface features created by rotational movement of the part including grooves and threads. To create a round surface, the CNC lathe rotates the workpiece while moving the cutters in the plane of the rotational axis. In this respect, the CNC lathe differs substantially from CNC mills, drills, and bores. The CNC lathe cutters typically have only one cutting surface. This places additional constraints on the tool orientation in the process of automatic CNC program generation.

The newest CNC Turn-Mill Machining Centers, shown for example in FIG. 3, combine the capabilities of CNC milling, drilling, boring, and turning machines. A complex part having planar and curvilinear surfaces can be completely manufactured by one machine in one set-up. The Turn-Mill machines make parts with greater precision than other CNC machines because they eliminate the need to reposition the workpiece between turning and milling operations. The programming of these powerful machines, however, represents a significant challenge for the machine operators.

BRIEF SUMMARY OF THE INVENTION

The invention provides a visual system and method for automatically generating a CNC program for machining parts with planar and curvilinear surfaces. These parts generally require a plurality of faces to visually define the part. A face is a two-dimensional view of the part that presents a graphic representation of information detailing a particular surface and a number of features (such as, for example, hole, slots, grooves, and threads) dimensionally referenced to the particular surface. A face may represent planar or curvilinear surfaces. Parts that require a large number of tools to machine the features are typically referred to as "tooling intensive parts." The subject invention uses a graphical user interface (GUI), that allows multiple windows to be displayed and accessed simultaneously on a computer monitor.

The system of the present invention comprises a graphical interface for inputting part information for defining (a) a plurality of faces, each face corresponding to a surface of the part and being displayed in a separate window, (b) a set of features associated with each of the plurality of faces, and (c) a set of machining operations and cutting tools associated with each element of the set of features. The system of the invention also comprises a datastore memory element, in communication with the interface, that maintains a datastore for storing the part information and a process optimization module, in communication with the datastore memory element, for receiving the part information. The process optimization module includes a memory element for maintaining a materials machineability database for selecting operational parameters for the set of machining operations and cutting tools and thereafter selectively ordering the set of machining operations. A code generation module, in communication with the process optimization module, that receives the ordered set of machining operations. The code generation module includes a configuration subsystem for creating a configuration file and thereafter using the configuration file to convert the ordered set of machine operations into a CNC program for machining the part.

The method of the present invention comprises the steps of inputting part information defining (1) a plurality of faces, each face corresponding to a surface of the part, (2) a set of part features associated with each of the plurality of faces, and (3) a set of machining operations and cutting tools associated with each element of the set of part features; storing the part information in a datastore memory element; selectively ordering the set of machining operations using a materials machineability database; and converting the ordered set of machining operations into a CNC program for machining the part.

BRIEF DESCRIPTION OF THE FIGURES

FIG. 11 illustrates an example of another window of a GUI for use with the preset invention.

FIG. 12 illustrates an example of program code generated by the present invention.

DETAILED DESCRIPTION OF THE INVENTION

Figure 1A:
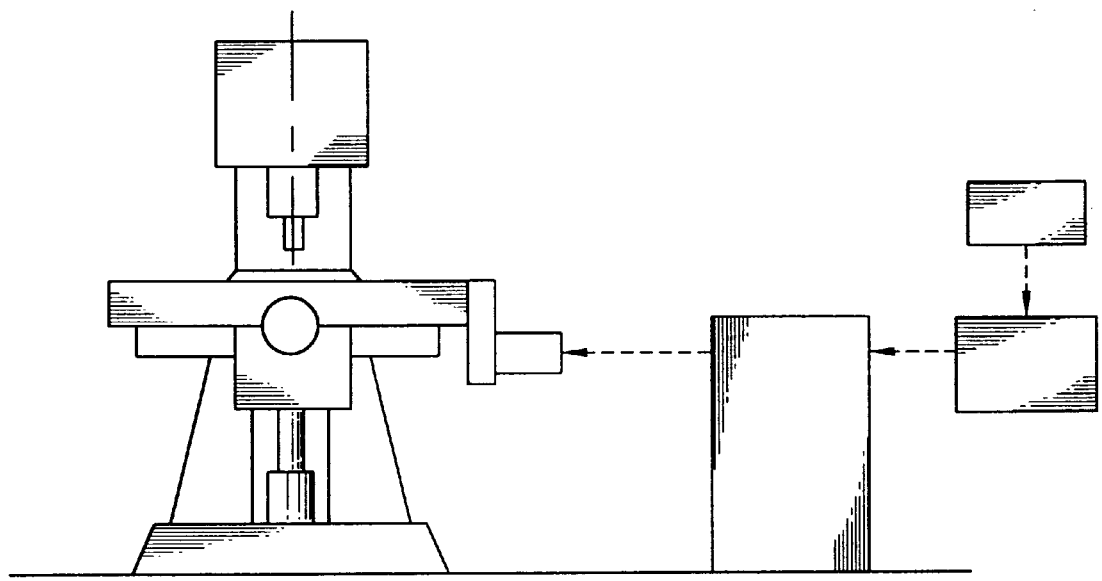
FIG. 1a and 1b illustrate examples of multi-axis CNC milling machines.

The system and method for generating a CNC program for machining parts with planar and curvilinear surfaces and surfaces of revolution according to the invention is illustrated in the drawings. FIG. 4 illustrates an engineering drawing 10 of a part 12 having a plurality of planar and curvilinear surfaces and surfaces of revolution. All of the information necessary to define the part 12 can be derived from the drawing 10. The drawing 10 contains pictorial and dimensional information defining the surfaces of revolution 12, 14, and 16 and the planar surfaces 18 and 20. The part 12 detailed in the drawing 10 would typically be machined from cylindrical stock three inches long and two and one-half inches in diameter. The drawing 10 may be a hard copy paper drawing or a standard formatted electronic drawing file, such as Drawing Exchange Format (DXF) or Initial Graphic Exchange System (IGES). The drawing 10 includes the geometry of the part 12 and the material makeup of the workpiece used to make the part 12. If the drawing 10 is a paper drawing, the information may be input to the system of the present invention using a conventional CAD program incorporated into the system of the present invention. The CAD program provides an operator with graphic tools to input the part information into the system, as specified in the drawing 10.

Figure 5:
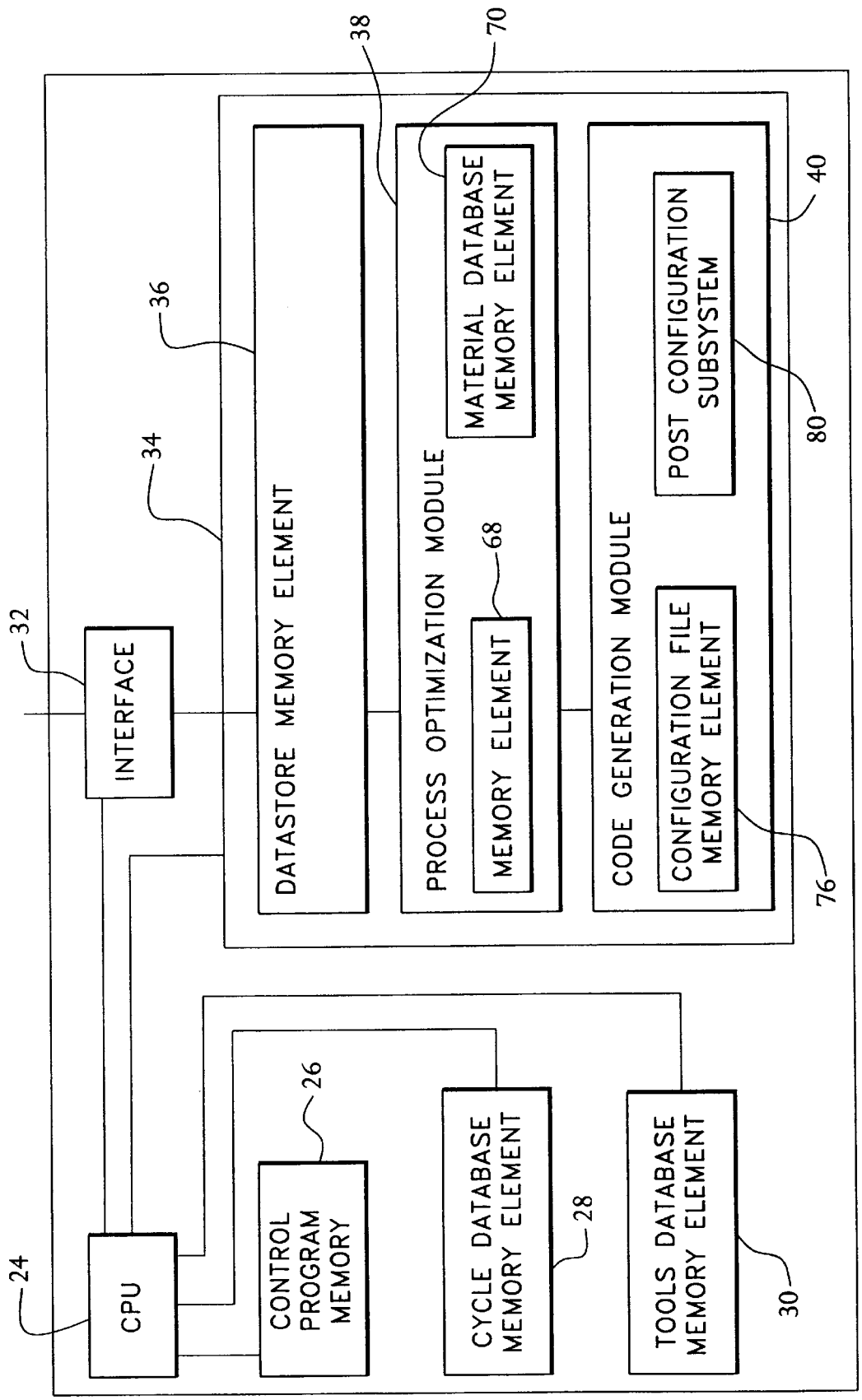
FIG. 5 illustrates a block diagram of an embodiment of a system of the present invention.

The present invention may be implemented using hardware, software, or any combination thereof. Furthermore, the system of the present invention may be incorporated into any one of the devices illustrated in FIG. 1–3. FIG. 5 illustrates an example of the components of the system of the present invention. These include a central processing unit (CPU) 24, a control program memory element 26, a cycles database memory element 28, a tools database memory element 30, an interface module 32, and an operations module 34. The CPU 24 controls the operation of the present invention and may be any processor capable of controlling such a system. The control program memory element 26 stores a control program that directs the CPU 24 to operate the system and implement the method of the present invention. The control program memory element 26 may be incorporated into the CPU 24 or may be a separate memory element. Similarly, the cycles database memory element 28, the tools database memory element 30, and the interface module 32 may be incorporated into the CPU 24, or may be separate elements or combined in any fashion to improve the functionality of the present invention. The operations module 34 includes a datastore memory element 36, a process optimization module 38, and a code generation module 40.

The interface module 32 enables an operator of the present invention to open a GUI, for example, a window 42 similar to one illustrated in FIG. 6. The window 42 includes a menu pull down system 44 and an icon system 46, that operates in conventional manner. Using the menu pull down system 44 and/or the icon system 46, the operator enters part information describing each surface (14–20) of the part 12. The part information is stored in a datastore memory element 36, which is a memory element capable of storing data. The part information includes information defining a plurality of faces 48, each face corresponding to a different surface (14–20) of the part 12. Each of the faces 48, required to define all of the surfaces of the part 12, is illustrated in a separate window and associatively stored in the datastore memory element 36. For example face 48a is illustrated in window 42a, face 48b is illustrated in window 42b, and face 48c is illustrated in window 42c. The face information includes a boundary, an orientation, and a type of machining function required to machine the particular face 48. If the drawing 10 is an electronic file, it is preferable that the geometry of each face 48 be illustrated in a separate face window 42. If, however, this convention is not followed, CAD tools allow the geometry of each face 48 to be copied and pasted into a separate face window 42.

Because the faces may be of topologically different types, a graphic icon 50 in a corner of a given face window 42 graphically identifies the face type. For example, icon 50a displayed in window 42a represents a turn surface, the icon 50b displayed in window 42b represents a surface milled on a flat end of a round workpiece and the icon 50c displayed in window 42c represents a cylinder milling surface. The capabilities of a particular CNC machine determine the available selection of faces. Using the pull-down menu system 44 available in the face window 42, a dialogue window 52 associated with each face window 42 may be opened. The face parameters dialogue window 52, an example of which is illustrated in FIG. 7, includes a pictorial representation 54 of the particular face type, corresponding to the icon 50, and a plurality of descriptive parameters of the face boundaries and parameters relating the positioning of the face relative to a coordinate system of the CNC machine. Using the face parameters dialogue window 52, the operator may input the values for each of the boundary and positioning parameters to define a particular face. The information for each face, input using the dialogue window 52, is separately stored in the datastore 36 in the form of a record for each face 48.

Figure 8:
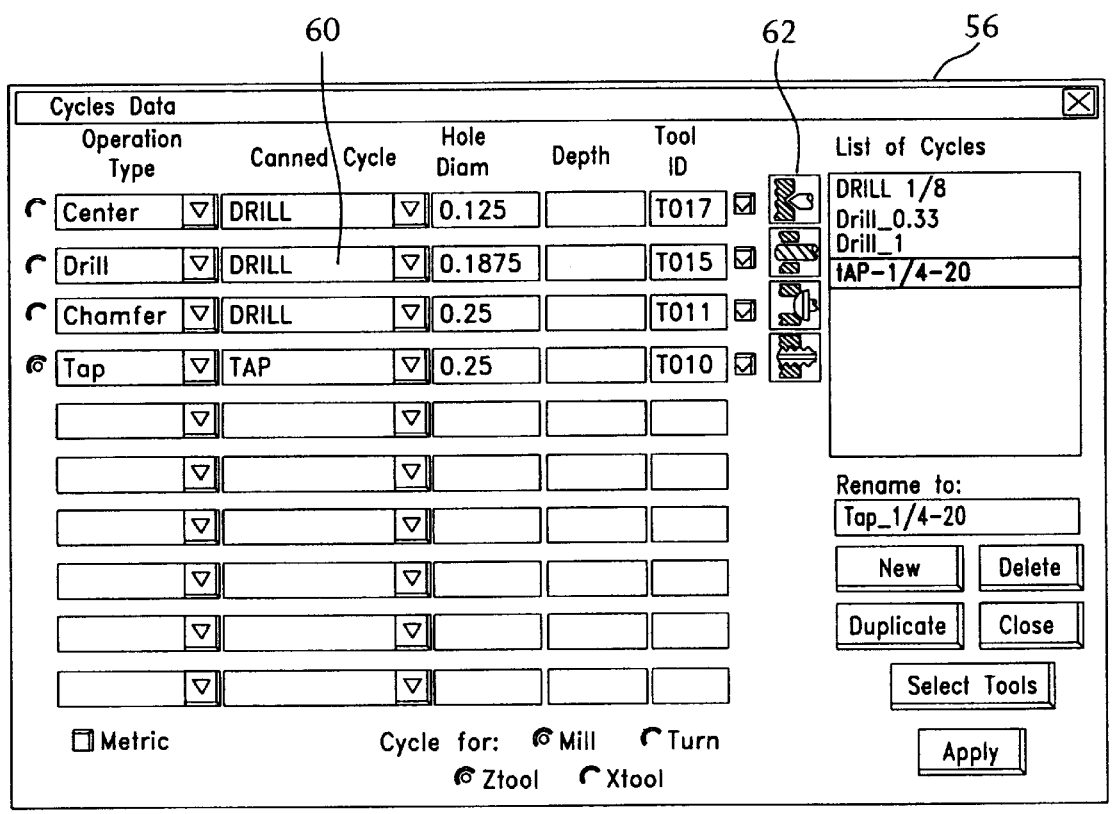
FIG. 8 illustrates an example of another window of a GUI for use with the present invention.

For each face 48, information defining a set of features associated with the face is input to the system using the GUI. Using the pull down menu system 44, the operator may open a cycles dialogue window 56, an example of which is illustrated in FIG. 8. The cycles dialogue window 56 enables the operator to define a cycle for machining a particular feature. A cycle is a set of operations for machining the particular feature. For example, the cycle illustrated in FIG. 8 includes four operations for creating a tapped, chamfered hole. The cycle parameter information includes the tooling, cutting path, and other operations information needed for machining a particular feature. The cycle includes an operation type, a canned cycle, a hole diameter, a hole depth, and a tool ID number. Using the cycles dialogue window 56 the operator may create a new cycle or gain access to the cycles database stored in the cycles database memory element 30 for retrieving a previously defined cycle. Each time a new cycle is defined it is stored in the cycles database for later use. A retrieved cycle can be reused or modified to create a new cycle. The cycles dialog window 56 displays the cycle parameter information using an easily modifiable table 60 with icons 62 of the tools used the cycle. This facilitates quick and easy modification of existing cycles to create new cycles. Once the cycle has been defined, it is applied to the face 48 through which the particular cycles dialogue window 56 was opened and is illustrated in a work space 58 in the face window 42 using a graphic representation of face features (e.g., holes, slots, pockets, grooves, and threads). A cycle for machining each feature of a particular face must be applied to that face. A listing of all of the cycles for a particular face will appear in the work space 58. Each feature requires a cycle to machine that feature. A cycle record, including the cycle parameter information, is created for each new feature and the cycle record is stored in the datastore and associated with the appropriate face information.

When defining a new cycle or modifying an existing cycle, the system draws information from the tool database stored in the tool database element 30. The tool database maintains a tool record for each tool available to the CNC machine. The tool database provides a complete predefined tool capability description for the CNC machine. Using the pull down menu system 44, the operator may open a tool dialogue window 64. The tool dialogue window 64 enables the operator to define a plurality of tools, e.g., end mills, face mills, slot mills, centering tools, dove tail mills, thread mills, spot drills, drills, cornering tools, bores, reams, taps, chamfers, facing turning tools, grooving tools, turning cutters, and threading tools, available for use by the CNC machine. The tool dialogue window 64 contains a pictorial representation 66 of the particular tool and a list of tool parameters. The tool parameters describing the tool are entered once and permanently maintained in the tool database as long as the tools are available in the given CNC machine. The system is capable of simulating and displaying the tool path and the process and material removal to shape a particular part feature. The system includes the ability to define special custom-shaped tools provided to a given CNC machine.

Once all of the features are described for all of the faces, the face information and the machining operations for each of the cycles is transferred from the datastore 36 to a memory 68 of the process optimization module 38. The process optimization module 38 schedules the machining operations to minimize process time. In the process optimization module 38, the cycles are dissembled into simple, individual machining operations and then the operations are grouped by tools, thus minimizing the number of tool changes. The CNC machine constraints define the sequence of operations. For example, in hole making processes, small diameter drills are used before larger diameter drills, and taps are used after drills. In milling, roughing mills are used before finishing mills.

Figure 10:
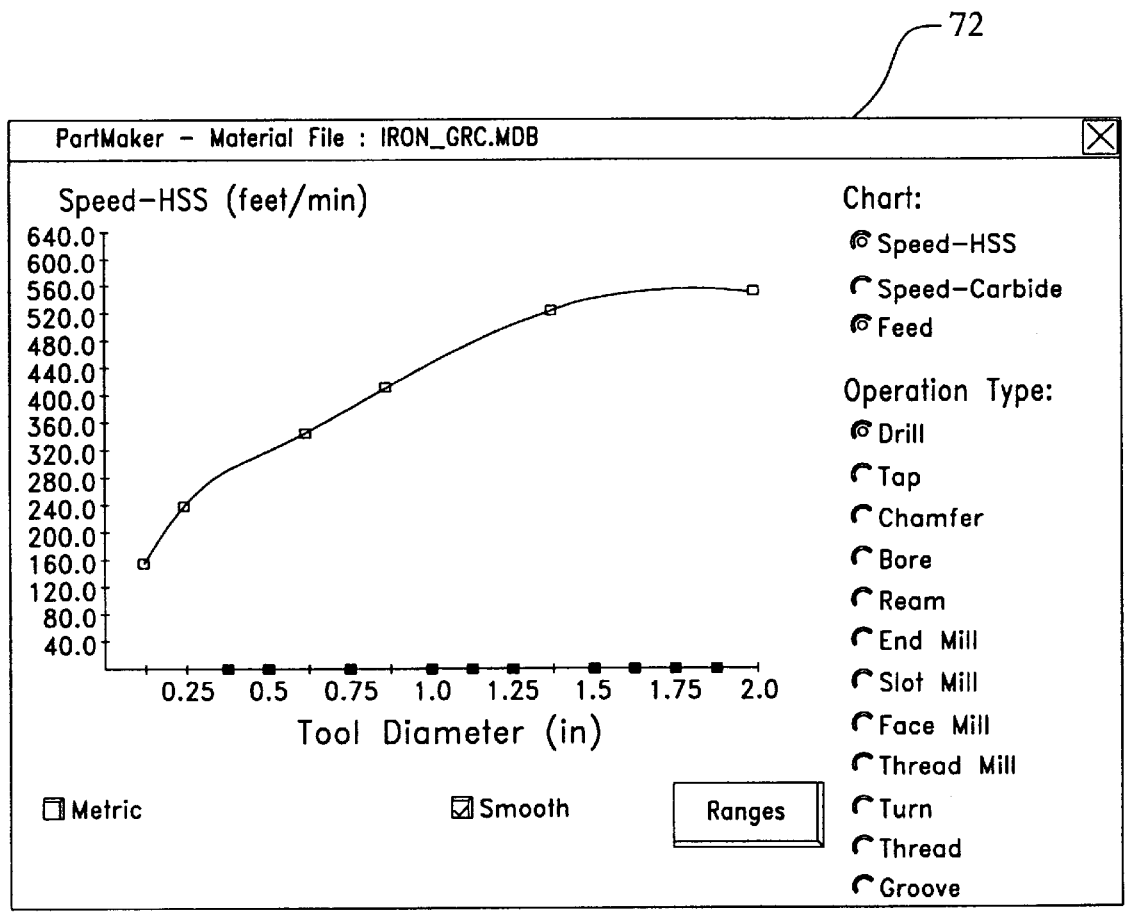
FIG. 10 illustrates an example of another window of a GUI for use with the present invention.
Figure 13:
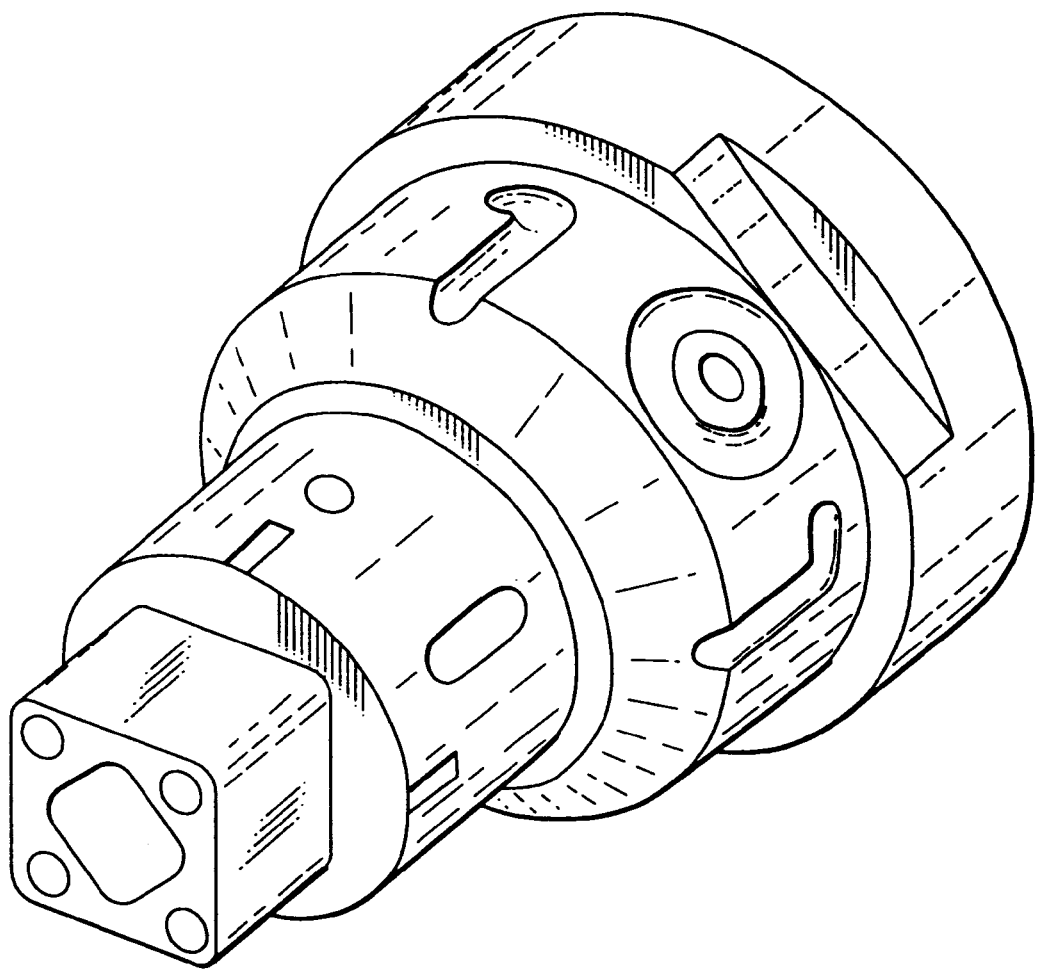
FIG. 13 illustrates a three-dimensional, solid model generated by the present invention.
Figure 6A:
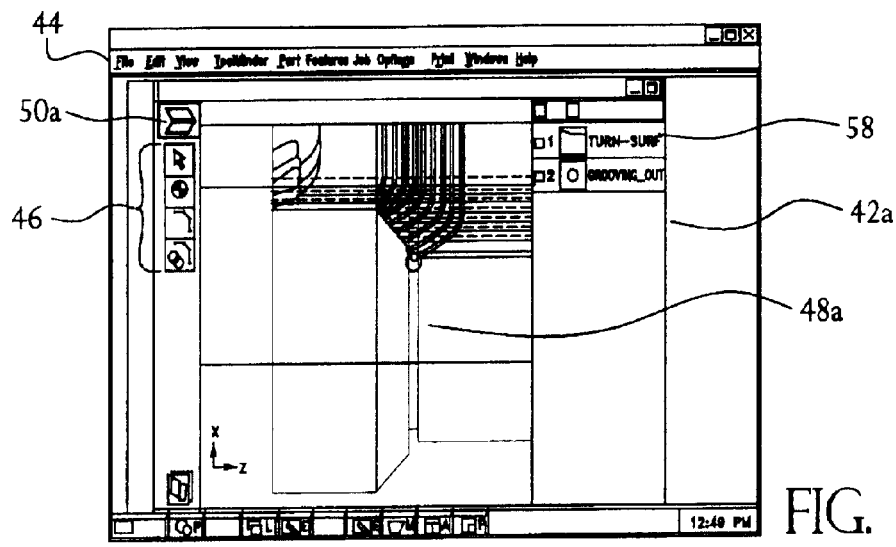
Figure 6B:
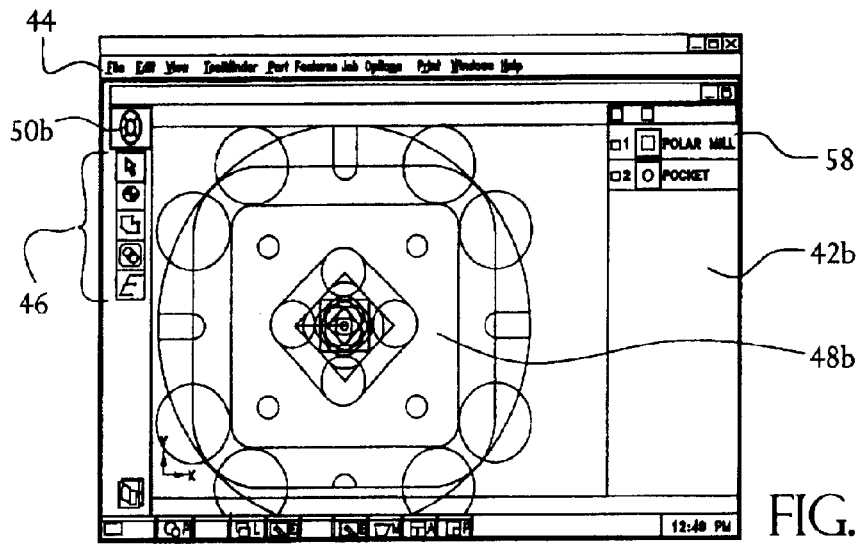

Using a material machinability database stored in a material database memory element 70, the process optimization module 38 selects the optimum tool cutting speed and feed for each operation. The material machinability database contains recommended material removal speeds as a function of tool parameters, such as diameter and number of cutting edges. The machinability database information may be presented in customizable charts 72, illustrated for example in FIG. 10. The operator may modify a standard chart by dragging the points on the chart up or down to suit his experience. The cutting speed and feed, once selected, is automatically reused for subsequent applications for other tools with the same material. The process optimization module also minimizes the process time by eliminating redundant tool changes and part repositioning in order to machine different faces.

The process optimization module generates a process table 74, an example of which is illustrated in FIG. 11, that includes the selectively ordered machining operations. The rows in the process table 74 correspond to machining operations describing the tools and operations. Each row includes a tool icon, a feed speed, a tool speed, a face to which the operation is to be applied, and the time to perform the operation. A special synchronization entry allows the operator to schedule operations to avoid tool collision from machines with multiple simultaneously operating tool-holding turrets and multiple spindles. The latter allows simultaneous cutting of the material from both ends of the part. Reordering of the display rows in the process table 74 changes the machine operation sequence.

The code generation module 40 uses the process table data and a machine specific configuration file stored in a configuration file memory element 76 to generate a set of code 78, an example of which is illustrated in FIG. 12, for use by a CNC machine. The machine specific configuration files are created using a post configuration subsystem 80. This allows an advanced user to customize an output of the code generation module 40 to generate code in a format compatible with any one of a variety of CNC machine types. If the part, according to the manufacturing process, has to be produced on more than one CNC machine or on a multi-spindle machine capable of execution of more than one CNC process, the code generation module 40 will produce a plurality of CNC programs. These programs may include special codes that synchronize execution of parallel processes.

The configuration file created with the post configuration subsystem 80 is used by the code generation module 40 as a set of templates to convert the process table data into a CNC program code 78. A separate template corresponds to a different action such as G01=linear move or G06=tool change. Templates use a combination of specific characters (called "letter address characters") such as "X", "Y", "Z", and variables such as <X-COORD>, <Y-COORD>, <Z-COORD>, to indicate the sequence of data. For example, a linear move template commonly looks as "G01X<X-COORD> Y<Y-COORD> Z<Z-COORD>". The code generation module 40 converts a template into a CNC program code 78 by substituting variables with their corresponding value from the process table of 74. For example, if a tool moves to a point X=1, Y=2, and Z=3, the linear move template is converted into a string "G01 X1.0 Y2.0 Z3.0". The resulting CNC program code 78 is a text file that can be recognized by a CNC control program.

The post configuration subsystem 80 uses a GUI "point and click" approach to construct templates from variables that are displayed in windows on the screen. In addition to templates, the post configuration subsystem 80 allows the user to customize all machine codes such as, but not limited to, motion types, coolant control, and tool wear. It also allows the user to assign a specific format to each numeric variable. The post configuration subsystem 80 contains a complete machine description.

When machining curvilinear and planar surfaces on a single CNC turn-mill machine with a plurality of spindles and tool-holding turrets and cartridges, the post configuration subsystem 80 consists of two "forks". One fork contains a complete description of a CNC mill, and one fork contains a complete description of a CNC lathe. If the part, according to the manufacturing process, has to be produced on more than one CNC machine or on a multi-spindle machine capable of execution more than one CNC process, the code generation module 400 may produce a plurality of CNC programs.

To validate the final CNC program, an optional code verifier can read, interpret, and execute each line of the CNC code and display the resultant actions. A 3D, solid model simulator reproduces cutting tool movements, the material removal, and the shaping of the workpiece into the machined part. The system can visually simulate fabrication of a specific feature by displaying a demonstration of the tool path associated with the machine operations for that feature. In addition, the system can visually simulate fabrication of all of the features associated with a face by displaying a demonstration of all of the tool paths of all of the tools associated with the machine operations for that face.

Implementation of the present invention uses the data that are entered into a CAM system defining a part by organizing the data into conventional features, e.g., surfaces, holes, slots, and threads. In order to machine each feature, multiple tools and operations are assigned to each cycle. New information entered into the system for a particular feature is automatically stored in the cycles database and the tools database and can be reused for programming other parts with similar features. This approach eliminates repetitive data entry and storage in contrast to prior art CAM systems that require entry of tooling and operations information in the sequence these operations are to be performed by the CNC machine for each new part.

The present invention may be embodied in other specific forms without departing from the spirit or essential attributes thereof and, accordingly, reference should be made to the appended claims, rather than to the foregoing specification, as indicating the scope of the invention.

What is claimed is:

1. A visual system for generating a CNC program to machine a part having planar and curvilinear surfaces and surfaces of revolution, comprising:

a graphical user interface for inputting part information for defining a plurality of faces, each face corresponding to a surface of the part defined by the tool and work piece orientation, boundary, and type of machining function and being displayed in a separate computer window;

a graphical user interface for inputting part information for defining a set of features associated with each of the plurality of faces;

a graphical user interface for inputting part information for defining a set of machining operations and cutting tools associated with each element of th set of features;

a datastore memory element, in communication with the graphical user interface, that maintains a datastore for storing the part information;

a process optimization module, in communication with the datastore memory element, for receiving the part information, the process optimization module including a memory element for maintaining a materials machineability database for selecting operational parameters for the set of machining operations and cutting tools and thereafter selectively ordering the set of machining operations; and code generation module, in communication with the process optimization module, that receives the ordered set of machining operations, the code generation module including a configuration graphical user interface subsystem for creating a configuration file and thereafter using the configuration file to convert the ordered set of machine operations into a CNC program for machining the part.

2. A system for generating a CNC program as recited in claim 1, further comprising a memory element for maintaining a cycles database for storing a plurality of cycle records, each record holding information for defining machining operations and cutting tools to machine a feature.

3. A system for generating a CNC program as recited in claim 1, further comprising a memory element for maintaining a tools database for storing a plurality of tools records, each record holding information for defining a tool available to the system.

4. A system for generating a CNC program as recited in claim 1, wherein the CNC program is for any one of a Turn-Mill, a Multi-Axis CNC Machining Center and a Multi-Axis Lathe.

5. A method for generating a CNC program to machine a part having planar and curvilinear surfaces and surfaces of revolution, comprising the steps of:

inputting part information defining a plurality of faces using a graphical user interface which includes computer windows, each face defined by the tool and work piece orientation, boundary, and type of machining corresponding to a surface of the part and being input by means of a separate window;

inputting using a graphical user interface information defining a set of operator selected part features associated with each of the plurality of faces;

inputting using a graphical user interface information defining a set of operator defined machining operations and cutting tools associated with each element of the set of part features;

storing the part faces and part features information in a datastore memory element;

selectively ordering the set of machining operations using a materials machineability database; and converting the ordered set of machining operations into a CNC program for machining the part.

6. A method of generating a CNC program as recited in claim 5, wherein the step of inputting the set of machining operations includes creating cycle records in a cycle database, each cycle record holding information for defining machining operations and cutting tools to machine a part feature.

7. A method of generating a CNC program as recited in claim 5, wherein the step of selectively ordering the set of machining operations includes selecting an optimum tool cutting speed and feed rate for each element of the set of machining operations.

8. A method of generating a CNC program as recited in claim 5, wherein the step of converting the ordered set of machining operations into a CNC program includes customizing a configuration subsystem and thereby creating a machine specific configuration file.

9. A method of generating a CNC program as recited in claim 5, wherein the CNC program is for any one of a Turn-Mill, a Multi-Axis CNC Machining Center and a Multi-Axis Lathe.

* * * * *

UNITED STATES PATENT AND TRADEMARK OFFICE
CERTIFICATE OF CORRECTION

Figure 6A:
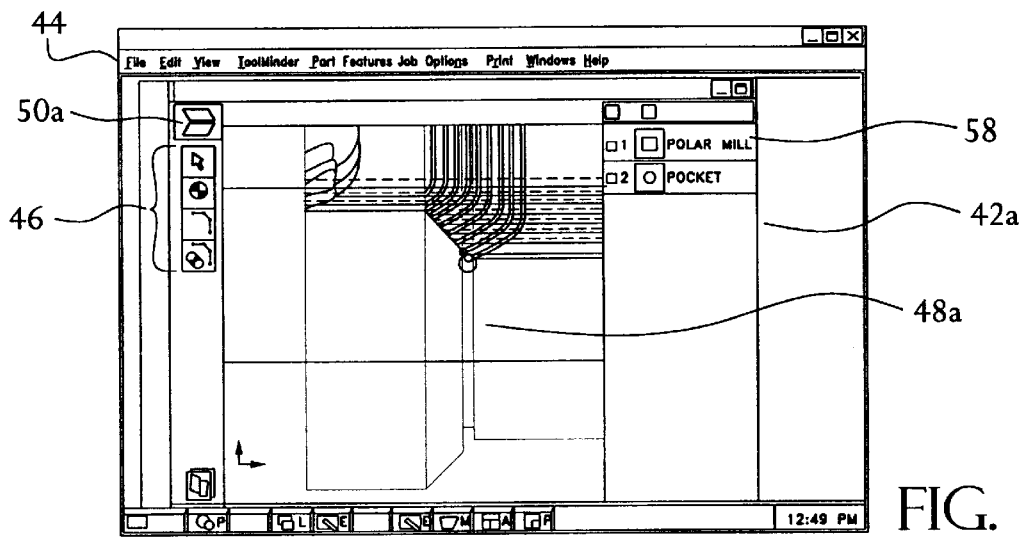
FIG. 6 illustrates three examples of a window of a GUI for use with the present invention.

PATENT NO.    : 6,112,133                                        Page 1 of 11
DATED         : August 29, 2000
INVENTOR(S)   : Lena Fishman It is certified that error appears in the above-identified patent and that said Letters Patent is hereby corrected as shown below:

<u>Drawings,</u>
<u>Figure 6A,</u>
Index letters X and Y for the arrows showing the principal axes were omitted, and the captions "turn-surf" and "Grooving_Out" and their associated pictograms respectively appeared incorrectly as "POLAR MILL" and "POCKET" and their associated pictograms. These errors are corrected in the following replacement drawing:

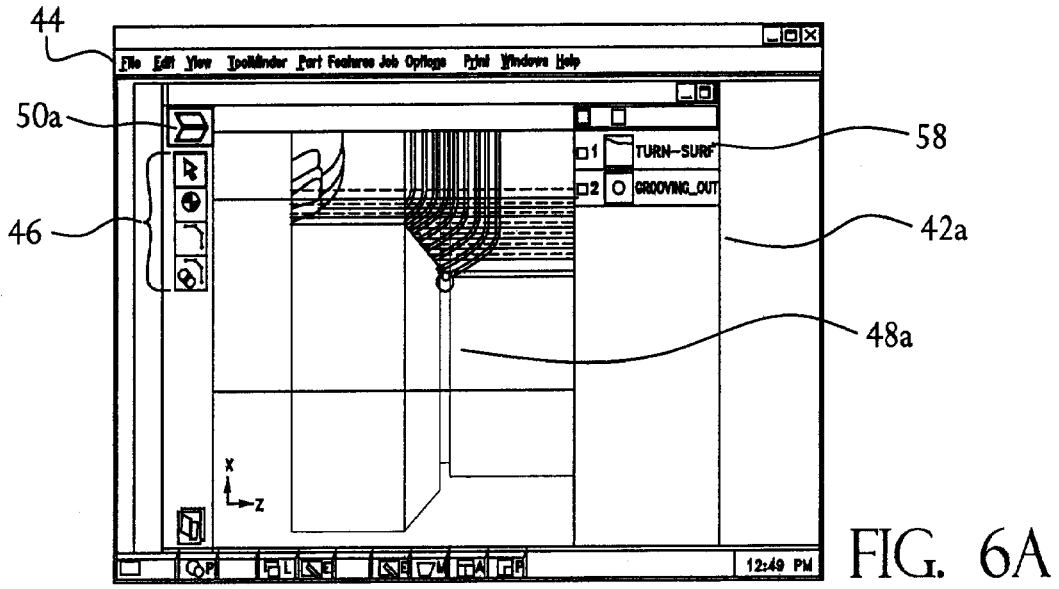

UNITED STATES PATENT AND TRADEMARK OFFICE
CERTIFICATE OF CORRECTION

PATENT NO. : 6,112,133
DATED : August 29, 2000
INVENTOR(S) : Lena Fishman

Figure 6B:
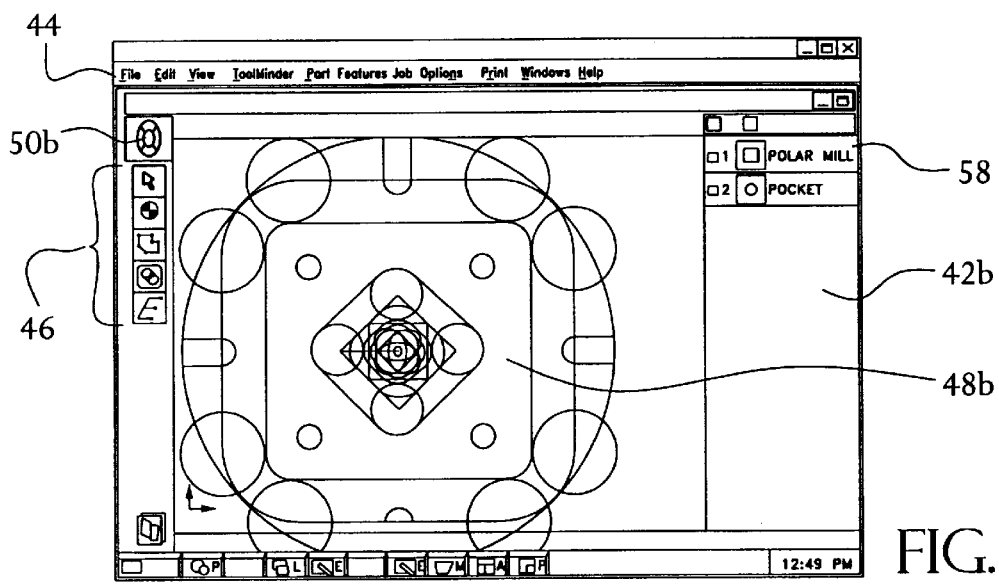

It is certified that error appears in the above-identified patent and that said Letters Patent is hereby corrected as shown below:

<u>Figure 6B,</u>
Index letters X and Y for the arrows showing the principal axes were omitted.
These errors are corrected in the following replacement drawing:

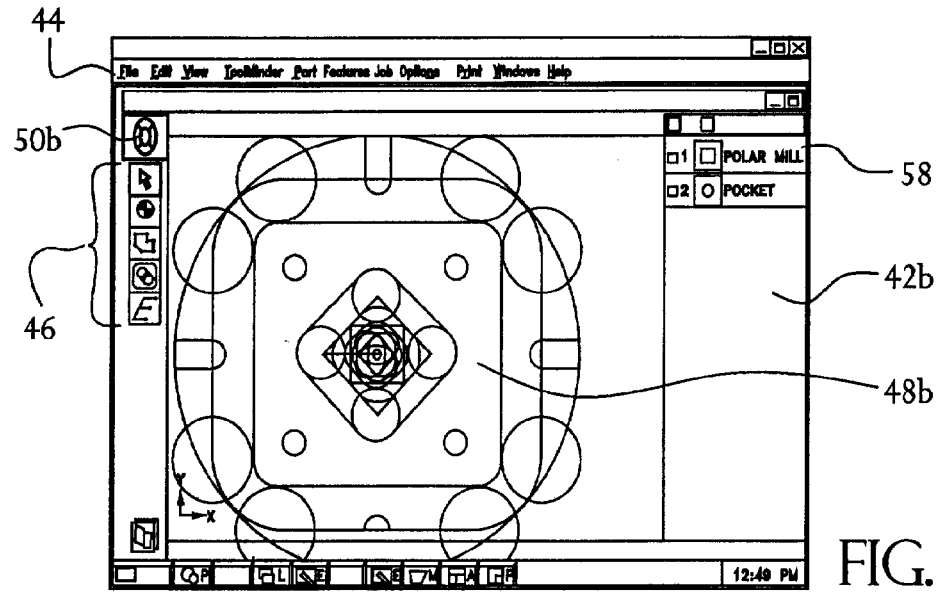

FIG. 6B

UNITED STATES PATENT AND TRADEMARK OFFICE
CERTIFICATE OF CORRECTION

Figure 6C:
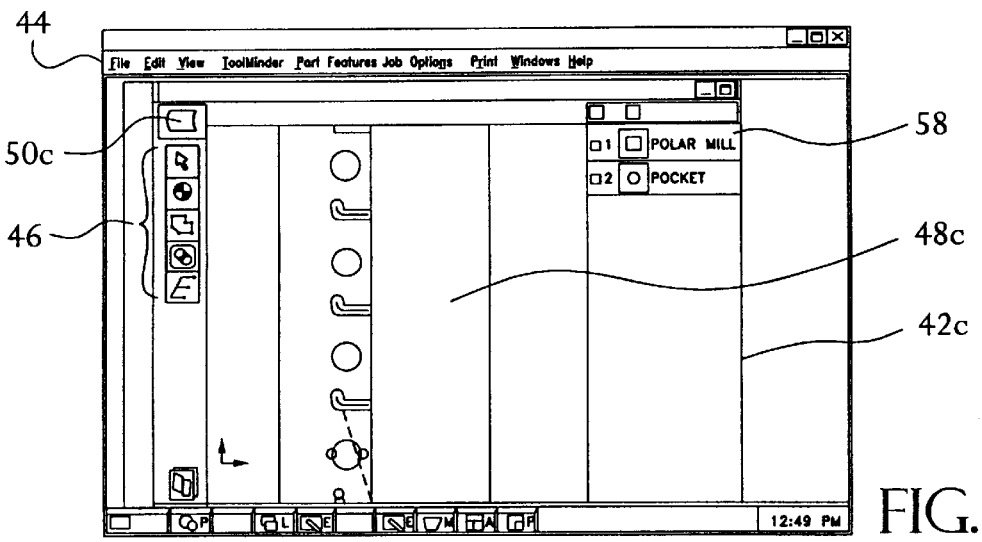

PATENT NO.    : 6,112,133
DATED         : August 29, 2000
INVENTOR(S)   : Lena Fishman It is certified that error appears in the above-identified patent and that said Letters Patent is hereby corrected as shown below:

Figure 6C,
Index letters C and Z for the arrows showing the principal axes were omitted, and the captions -- bayonet -- and -- Circle -- and their associated pictograms respectively appeared incorrectly as "POLAR MILL" and "POCKET" and their associated pictograms. These errors are corrected in the following replacement drawing:

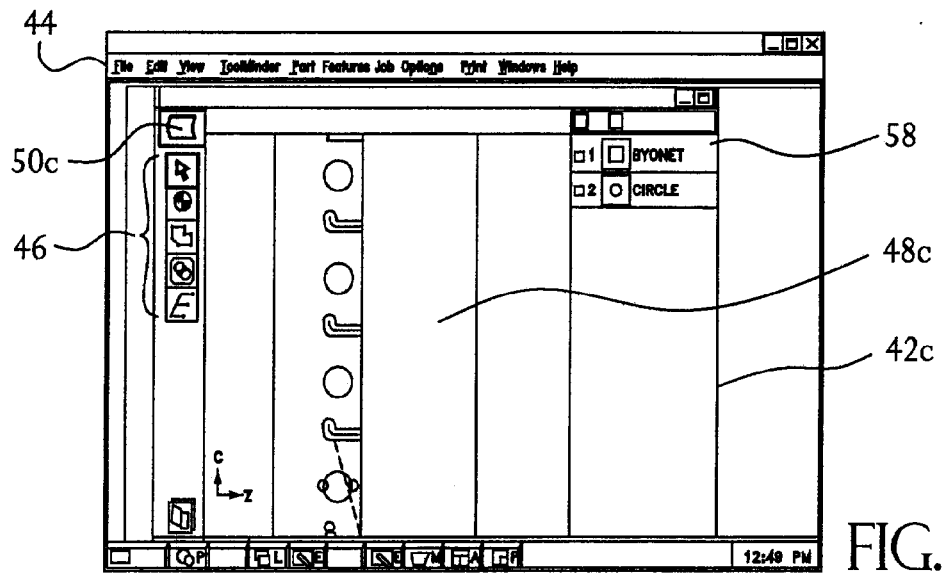

UNITED STATES PATENT AND TRADEMARK OFFICE
CERTIFICATE OF CORRECTION

PATENT NO. : 6,112,133
DATED : August 29, 2000
INVENTOR(S) : Lena Fishman

Figure 7A:
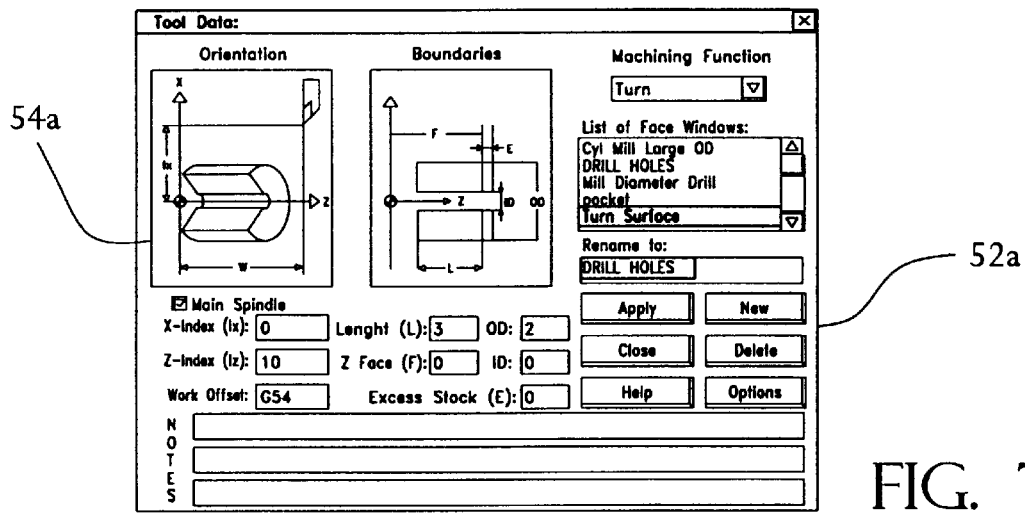
FIG. 7 illustrates three examples of another window of a GUI for use with the present invention.

It is certified that error appears in the above-identified patent and that said Letters Patent is hereby corrected as shown below:

Figure 7A,
The heading -- :Setup -- appeared incorrectly as "Tool Data:"; the dimension -- lz -- in the orentation image was incorrectly shown as "w"; the index letter for the x-axis in the Boundaries image was omitted; the "Rename to:" field incorrectly appeared as "DRILL HOLES" instead of -- Turn Surface --; the word -- Length -- was misspelled; and the dimension lz was incorrectly shown as "10" instead of -- 0 --. These errors are corrected in the following replacement drawing:

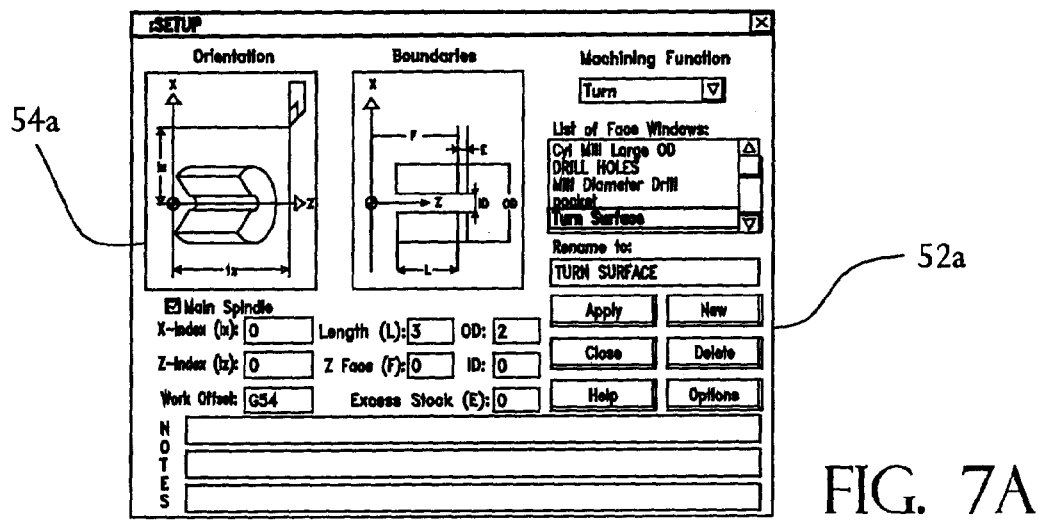

FIG. 7A

UNITED STATES PATENT AND TRADEMARK OFFICE
CERTIFICATE OF CORRECTION

PATENT NO. : 6,112,133
DATED : August 29, 2000
INVENTOR(S) : Lena Fishman

Figure 7B:
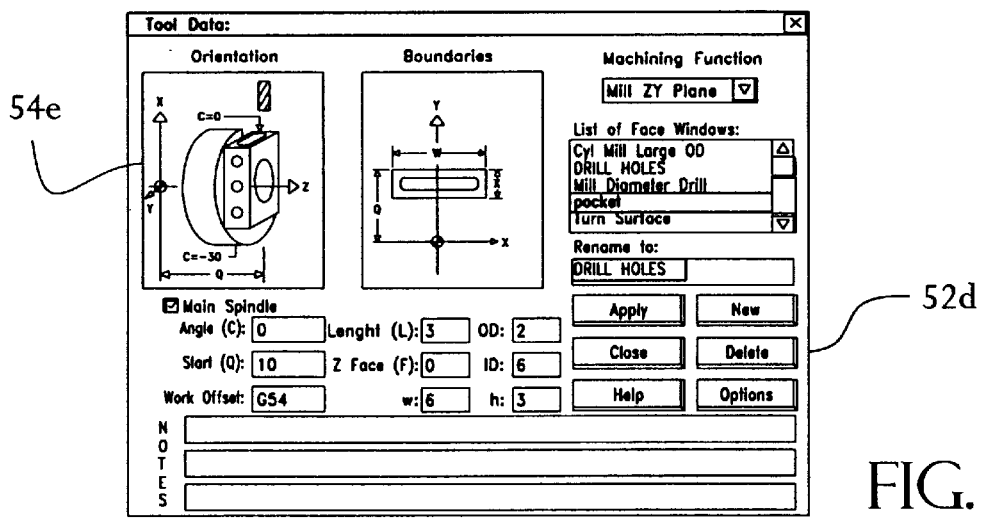

It is certified that error appears in the above-identified patent and that said Letters Patent is hereby corrected as shown below:

Figure 7B,
The heading -- :Setup -- appeared incorrectly as "Tool Data:"; in the Boundaries image the index letters for the y- and z-axes were incorrectly shown as "x" and "y", respectively, and the dimension -- h -- was incorrectly shown as "x"; the "Rename to:" field incorrectly appeared as "DRILL HOLES" instead of -- pocket --; and the word -- Length -- was misspelled. These errors are corrected in the followng replacement drawing:

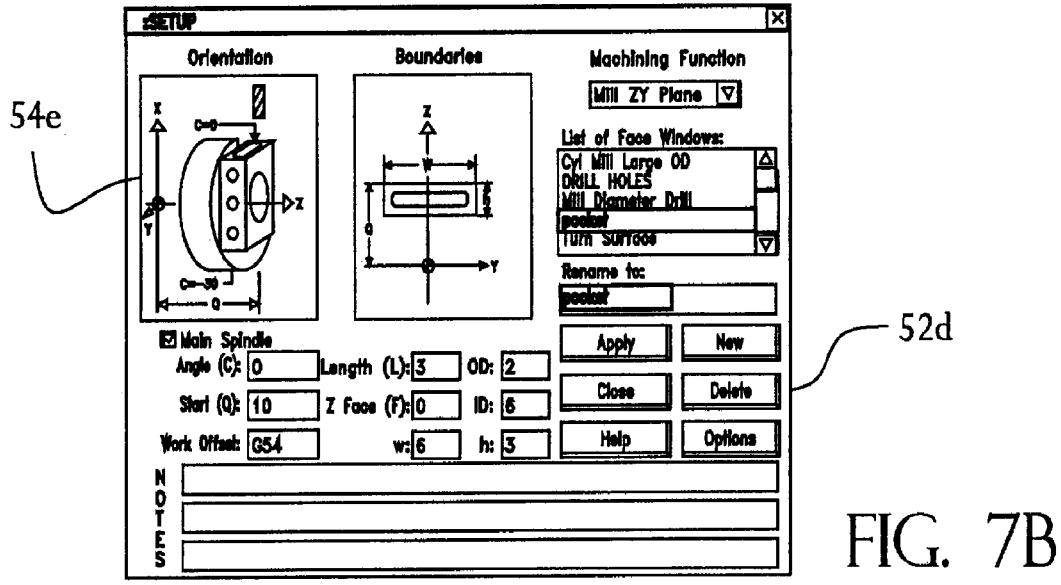

FIG. 7B

UNITED STATES PATENT AND TRADEMARK OFFICE
CERTIFICATE OF CORRECTION

Figure 7C:
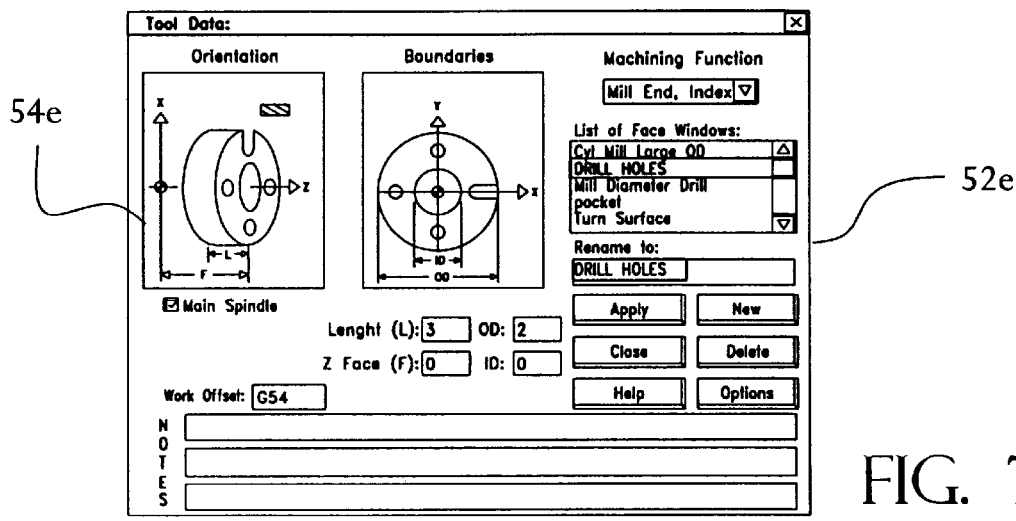

PATENT NO.    : 6,112,133
DATED         : August 29, 2000
INVENTOR(S)   : Lena Fishman It is certified that error appears in the above-identified patent and that said Letters Patent is hereby corrected as shown below:

Figure 7C,
The heading -- :Setup -- appeared incorrectly as "Tool Data:"; and the word
-- Length -- was misspelled. These errors are corrected in the following replacement drawing:

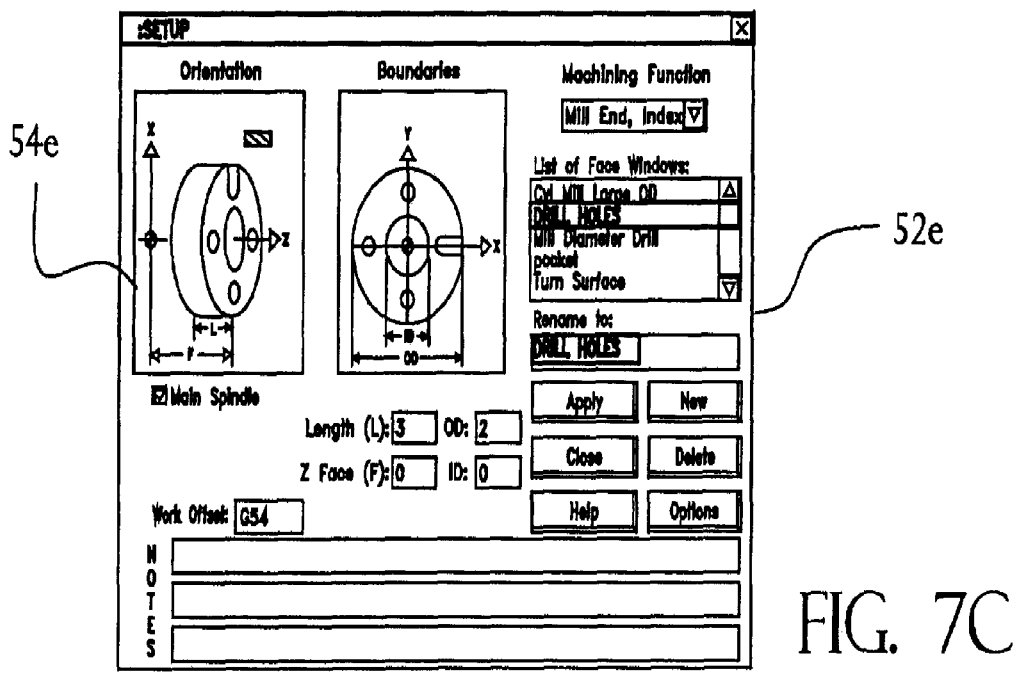

UNITED STATES PATENT AND TRADEMARK OFFICE
CERTIFICATE OF CORRECTION

PATENT NO. : 6,112,133
DATED : August 29, 2000
INVENTOR(S) : Lena Fishman

It is certified that error appears in the above-identified patent and that said Letters Patent is hereby corrected as shown below:

Figure 8,
The entry -- Tap-1/4-20 -- appeared incorrectly as "tAP-1/4/20" in the list of Cycles, and as "Tap_1/4-20" in the Rename to: field. These errors are corrected in the following replacement drawing:

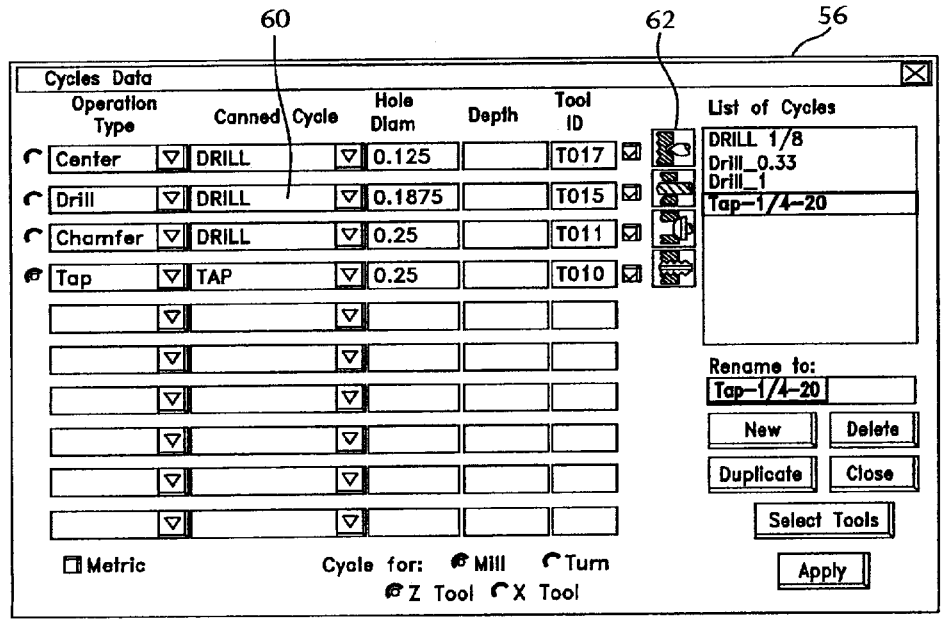

FIG. 8

UNITED STATES PATENT AND TRADEMARK OFFICE
CERTIFICATE OF CORRECTION

Figure 9A:
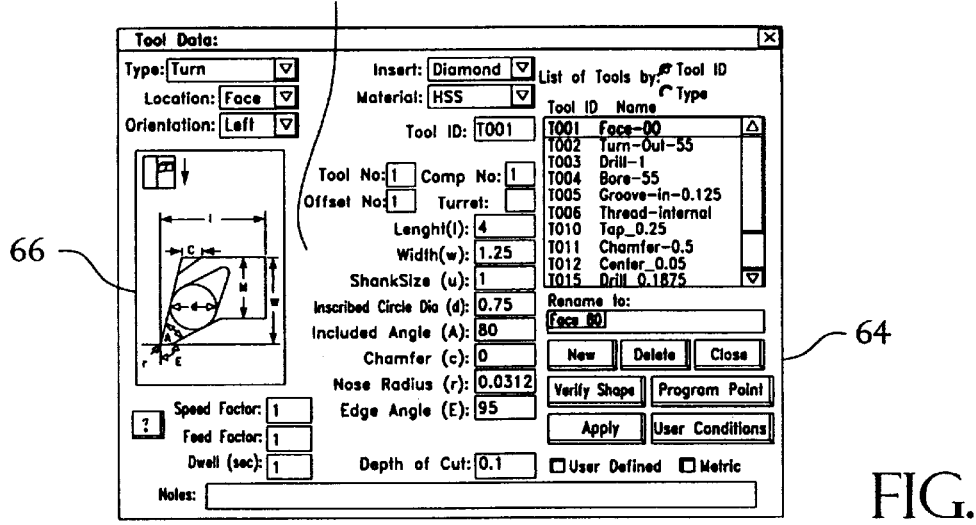
FIG. 9 illustrates three example of another window of a GUI for use with the present invention.

PATENT NO.    : 6,112,133                                      Page 8 of 11
DATED         : August 29, 2000
INVENTOR(S)   : Lena Fishman It is certified that error appears in the above-identified patent and that said Letters Patent is hereby corrected as shown below:

Figure 9A,
The word -- Length -- was misspelled. This error is corrected in the following replacement drawing:

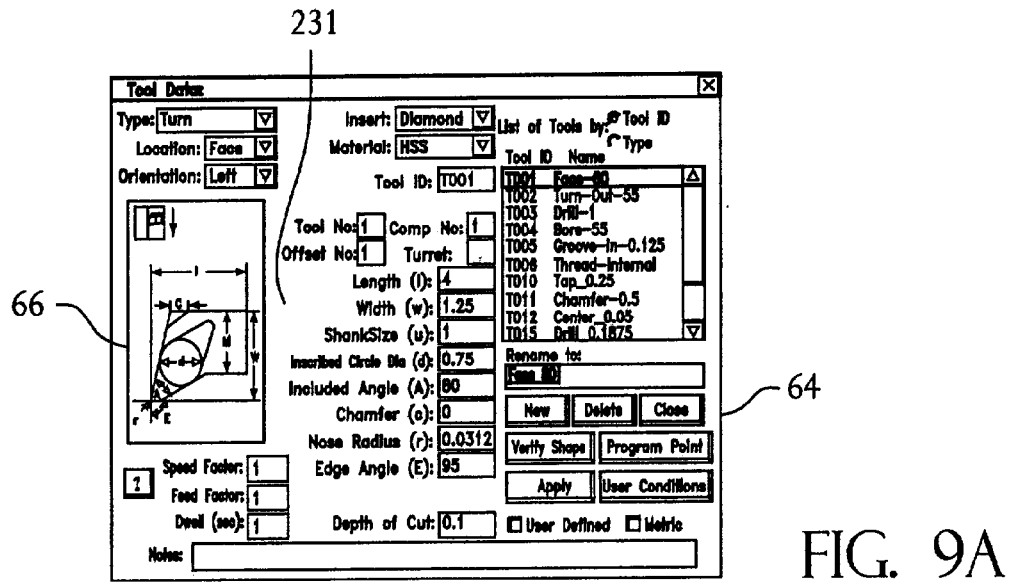

FIG. 9A

UNITED STATES PATENT AND TRADEMARK OFFICE
CERTIFICATE OF CORRECTION

PATENT NO. : 6,112,133
DATED : August 29, 2000
INVENTOR(S) : Lena Fishman

Figure 9B:
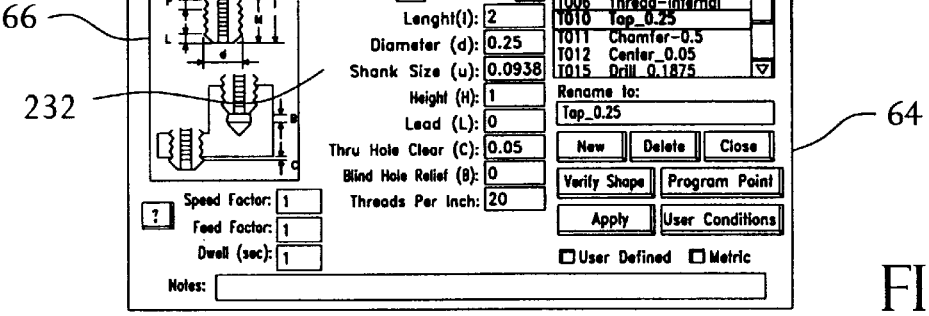

It is certified that error appears in the above-identified patent and that said Letters Patent is hereby corrected as shown below:

Figure 9B,
The type, which should have read -- Tap -- incorectly appeared as "Turn"; the Orientation, which should have read -- Z Tool --, incorrectly appeared as "Left"; and the word -- Length -- was misspelled. These errors are corrected in the following drawing:

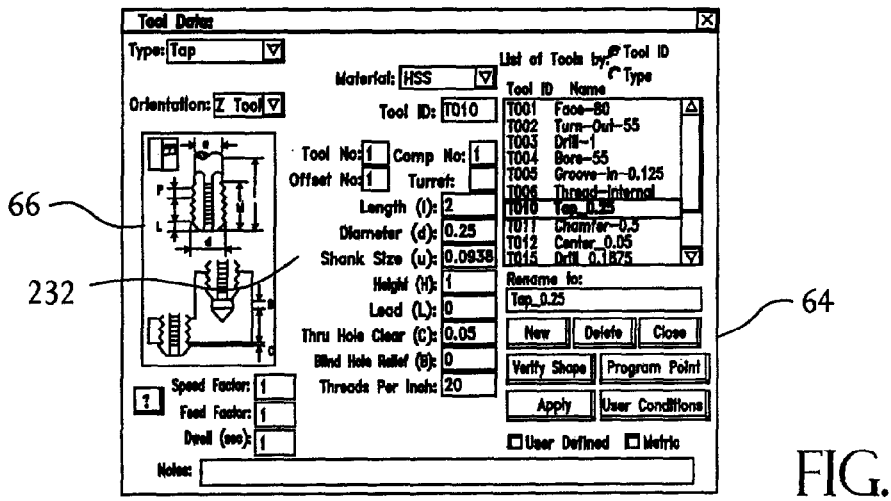

FIG. 9B

UNITED STATES PATENT AND TRADEMARK OFFICE
CERTIFICATE OF CORRECTION

PATENT NO. : 6,112,133
DATED : August 29, 2000
INVENTOR(S) : Lena Fishman

Figure 9C:
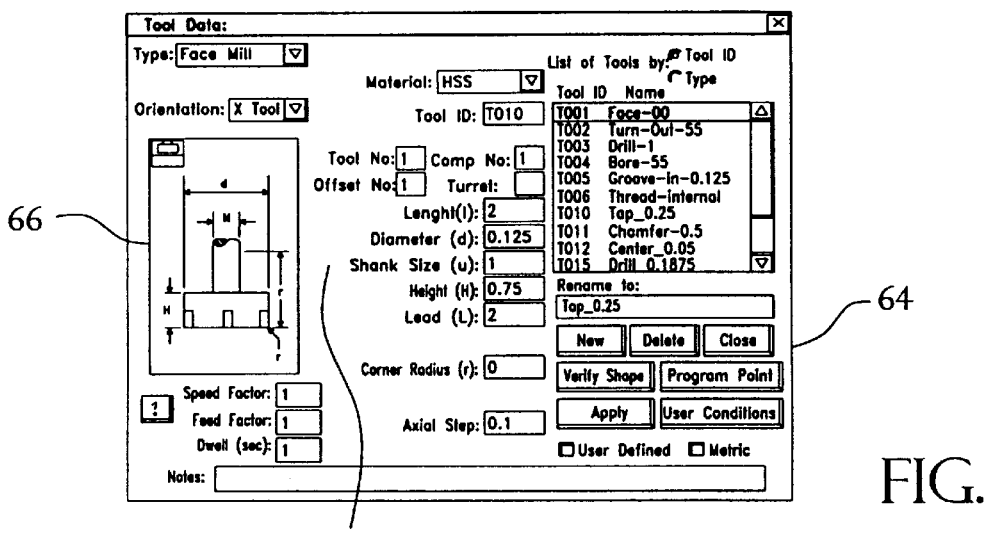

It is certified that error appears in the above-identified patent and that said Letters Patent is hereby corrected as shown below:

Figure 9c,
The dimension -- 1 -- in the image incorrectly appeared as "r"; the word
-- Length -- was misspelled; the value of the Length 1, which should have been -- 4 --,
incorrectly appeared as "2"; the -- Number of Flutes: -- was incorrectly captioned as
"Lead (L)"; and the Rename to: field, which should have read -- Face-80 --, incorrectly
read "Tap_0.25". These errors are corrected in the following replacement drawing:

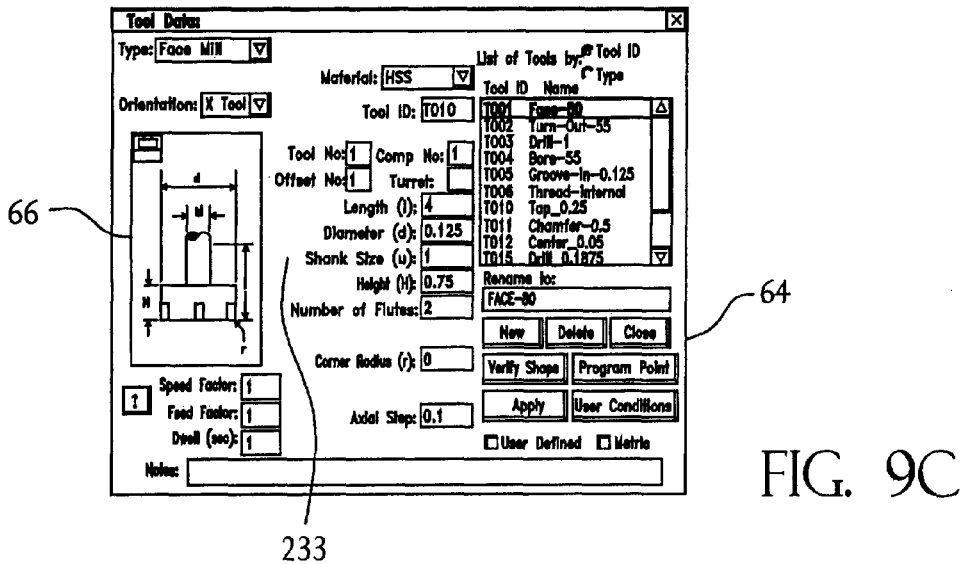

FIG. 9C

UNITED STATES PATENT AND TRADEMARK OFFICE
CERTIFICATE OF CORRECTION

PATENT NO. : 6,112,133
DATED : August 29, 2000
INVENTOR(S) : Lena Fishman

It is certified that error appears in the above-identified patent and that said Letters Patent is hereby corrected as shown below:

Figure 11,
The caption -- Total Time (min): -- incorrectly appeared as "Total 9min):". This error is correct in the following replacement drawing:

FIG. 11

Signed and Sealed this

Twenty-third Day of July, 2002

*Attest:*

*Attesting Officer*

JAMES E. ROGAN
*Director of the United States Patent and Trademark Office*

US006112133C1

(12) EX PARTE REEXAMINATION CERTIFICATE (5053rd)
United States Patent
Fishman

(10) Number: US 6,112,133 C1
(45) Certificate Issued: Jan. 18, 2005

(54) VISUAL SYSTEM AND METHOD FOR GENERATING A CNC PROGRAM FOR MACHINING PARTS WITH PLANAR AND CURVILINEAR SURFACES

(75) Inventor: Lena Fishman, Maple Glen, PA (US)

(73) Assignee: IMCS, Inc., Maple Glen, PA (US)

Reexamination Request:
No. 90/006,537, Feb. 4, 2003

Reexamination Certificate for:
Patent No.: 6,112,133
Issued: Aug. 29, 2000
Appl. No.: 09/187,573
Filed: Nov. 5, 1998

Certificate of Correction issued Jul. 23, 2002.

Related U.S. Application Data

(60) Provisional application No. 60/076,261, filed on Feb. 27, 1998.

(51) Int. Cl.[7] ............................................. G06F 19/00
(52) U.S. Cl. ........................ 700/182; 700/180; 708/130; 707/104
(58) Field of Search .......................... 700/87, 179, 173, 700/178, 177, 182, 180; 708/130; 707/104

(56) References Cited

PUBLICATIONS

"Knowledge–Based Software Boosts Part Programming Productivity" Modern Machine Shop Magazine, Jun. 1996 Issue.
International Manufacturing Computer Services Inc. Part-Maker, pp. 269–276, 445–454, NC Software Buyer's Guide. The Authoritative Guide to Numerical Control Software and Systems, Third Edition, CIMdata, 1995.
PartMaker News, ICMS Publications, Jun. 1995.
Software Update, Manufacturing Engineering Magazine, Aug. 1995.
Part Programming System Creates Tooling Data Bases, pp. 11–12, Advanced Manufacturing Technology, Sep. 15, 1995.
Knowledge–Based CAM Software, p. 181, Modern Machine Shop Magazine, Sep. 1995.
CAM Software with Tool Memory, p. 46, Metlfax Magazine, Dec. 1995.
PartMaker Advertisement 1996 CNC & Software Guide.
PartMaker Product Brochure, IMCS, Inc. 1996.
CAM System Optimizes Multiple Sides Machining, p. 185, Modern Machine Shop Magazine, Mar. 1997.
PartMaker Version 2.1 User Guide, IMCS, Inc., 1995.
Partmaker Version 2.3 User Guide, IMCS, Inc., 1997.
MSC Catalog, 1997.

Primary Examiner—Kidest Bahta

(57) ABSTRACT

The present invention comprises a system and method for generating a CNC program for machining a part having planar and curvilinear surfaces and surfaces of revolution comprising an interface for inputting part information including for at least one face corresponding to at least one surface of the part and having face information comprising a boundary, an orientation, and a type of machining function corresponding to the face. A set of features corresponding to each face is also input via the interface. Thereafter a set of machining operations to machine the set of features is generated. The machining operations are optimized to achieve a minimum process time to machine the part.

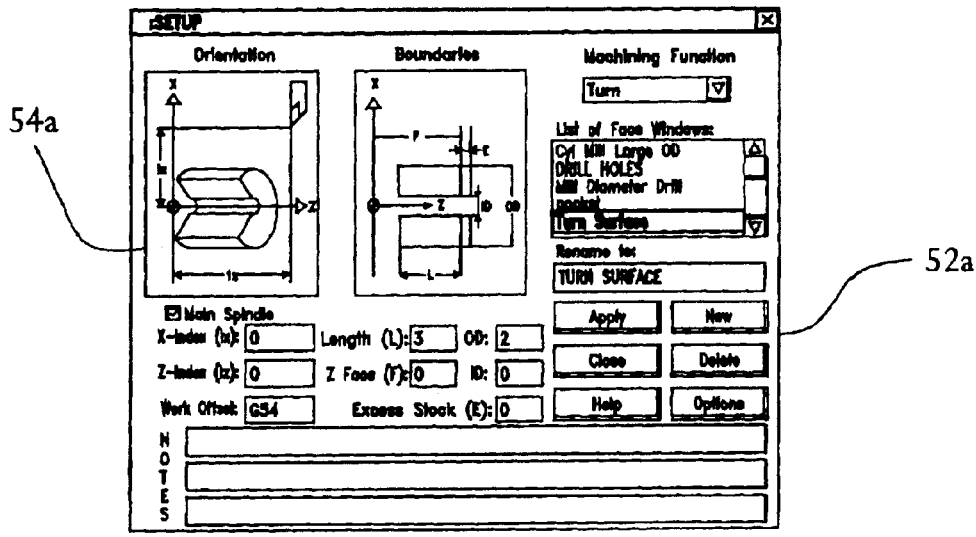

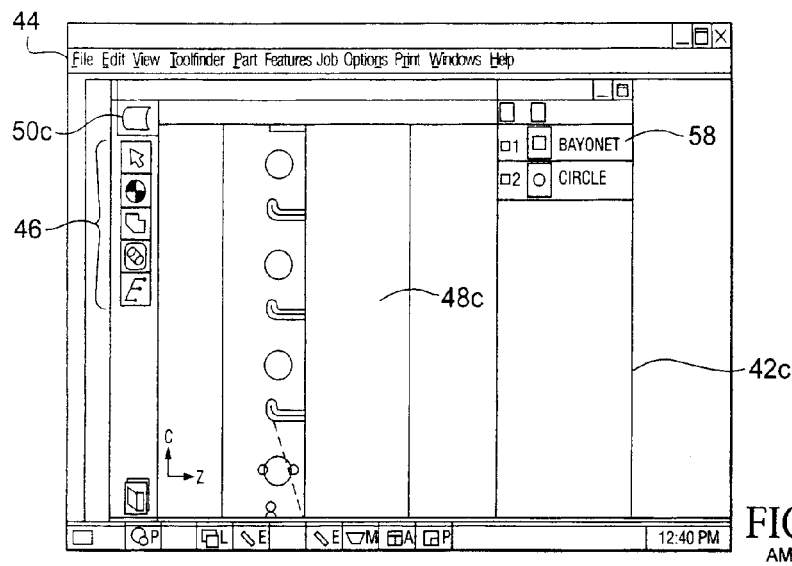
FIG. 6C
AMENDED

```
PartMaker - PART.TXT
%
:12
N3G0G90G92X0Y0Z0
N4M06T4
N5X 1.225Y 1.005S929M3
N6G43Z20H4
N7T2
N8Z0.05
N9G1Z-0.25F2.777
N10G41D1X0.96Y0.74F5.554
N11G3X0.85Y0.475I0.265J-0.265
N12G1Y-0.475
N13G2X0.475Y-0.85I-0.375J0.
N14G1X-0.475
N15G2X-0.85Y-0.475I0.J0.375
N16G1Y0.475
N17G2X-0.475Y0.85I0.375J0.
N18G1X0.475
N19G2X0.85Y0.475I0.J-0.375
N20G3X0.96Y0.21I0.375J0.
N21G1G40X1.225Y-0.055
N22G0Z0.1
N23Y1.005
N24Z-0.2
N25G1Z-0.5F2777
N26G41D1X0.96Y0.74F5.554
N27G3X0.85Y0.475I0.265J-0.265
N28G1Y-0.475
N29G2X0.475Y-0.85I-0.375J0.
N30G1X-0.475
N31G2X-0.85Y-0.475I0.J0.375
N32G1Y0.475
N38G0Z0.1
N39Z0.1
N40Y1.005
N41Z0.05
N42G1Z-0.5F2777
N43G41D1X0.96Y0.74F5.554
N44G3X0.85Y0.475I0.265J-0.265
N45G1Y-0.475
N46G2X0.475Y-0.85I-0.375J0.
N47G1X-0.475
N48G2X-0.85Y-0.475I0.J0.375
N49G1Y0.475
N50G2X-0.475Y0.85I0.375J0.
```

FIG. 12
AMENDED

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicated additions made to the patent.

ONLY THOSE PARAGRAPHS OF THE SPECIFICATION AFFECTED BY AMENDMENT ARE PRINTED HEREIN.

Column 1, line 64–Column 2, line 20:

A typical machine part includes [of] one or more surfaces wherein each surface may contain multiple standard mechanical features, e.g., holes, slots, pockets, grooves, or threads. A mechanical drawing of the part contains sufficient information about the geometrical shape, the features, and the material of the part to define the part. The features are typically referenced to a surface on which they are located. Each surface is drawn as a separate view of the part. The surfaces may be planar of curvilinear surfaces created by a milling procedure or a curvilinear surface or a surface of revolution created by a turning procedure. Machining the features involved using a large number of cutting tools and setting machining parameters for every operation. For example, a simple tapped hole may require a minimum of four tools: center drill, drill, tap, and chamfering tool. Numerous parameters such as speed, feed rate, and depth of cut might be required for each operation. In order to optimize the manufacturing process, the sequence of machine operations may have to be changed from the order in which the data were initially entered. Cost effective production dictates minimizing time invested in generating a validated CNC program and maximizing tool and equipment utilization. Expert knowledge is essential in organizing an efficient production process.

Figure 1B:
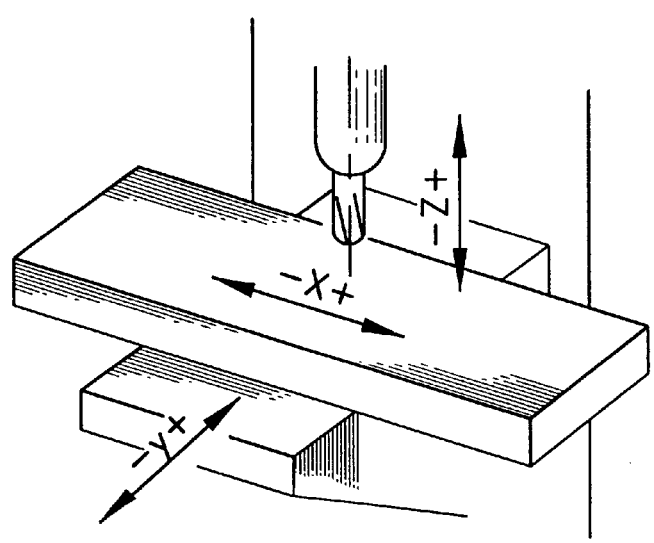

Column 2, lines 54–64:

CNC Milling Machines and Machine Centers, shown for example in FIGS. 1A and 1B, are used for producing essentially flat or sculptured surfaces and for machining features (such as holes, slots, and pockets) on these surfaces. In this system, the workpiece moves in a linear fashion, while the cutting tool simply rotates. Relative to the cutting tool, the part moves in the X-, Y-, and Z-directions. Multi-Axis Machining Centers, shown for example in FIGS. [1b] *1C and 1D*, allow tilt to A-, B-, C-angles around X-, Y-, and Z-axes, respectively. Simpler machines, like CNC drills and bores, cut material only on one axis.

Figure 2A:
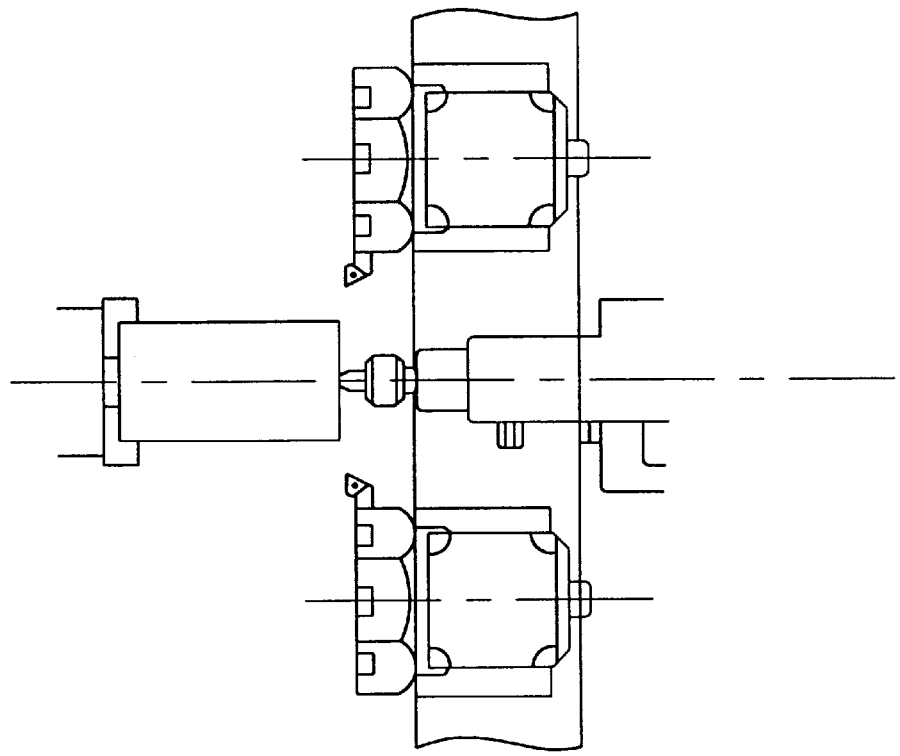
FIG. 2 illustrates an example of a CNC lathe with two tool turrets.
Figure 2B:
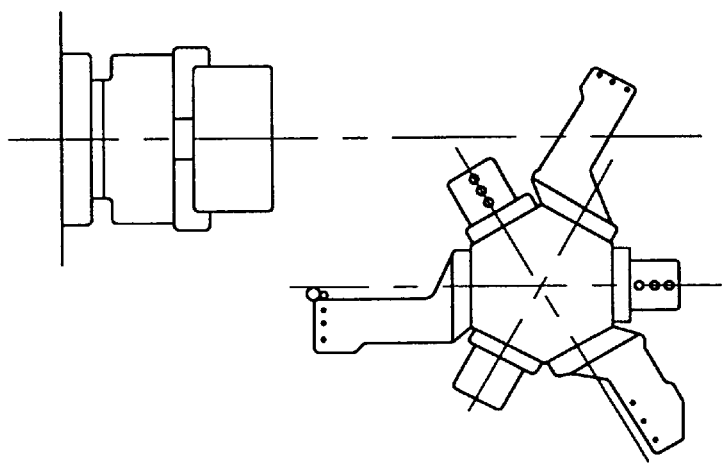

Column 2, line 65–Column 3, line 9:

A CNC lathe (CNC Turning Machine), shown for example in [FIG. 2] *FIGS. 2A and 2B*, produces parts having curvilinear inner and outer surfaces of revolution, e.g., solid or hollow cylinders, cones, semi-spheres, and parts with surface features created by rotational movement of the part including grooves and threads. To create a round surface, the CNC lathe rotates the workpiece while moving the cutters in the plane of the rotational axis. In this respect, the CNC lathe differs substantially from CNC mills, drills, and bores. The CNC lathe cutters typically have only one cutting surface. This places additional constraints on the tool orientation in the process of automatic CNC program generation.

Figure 3A:
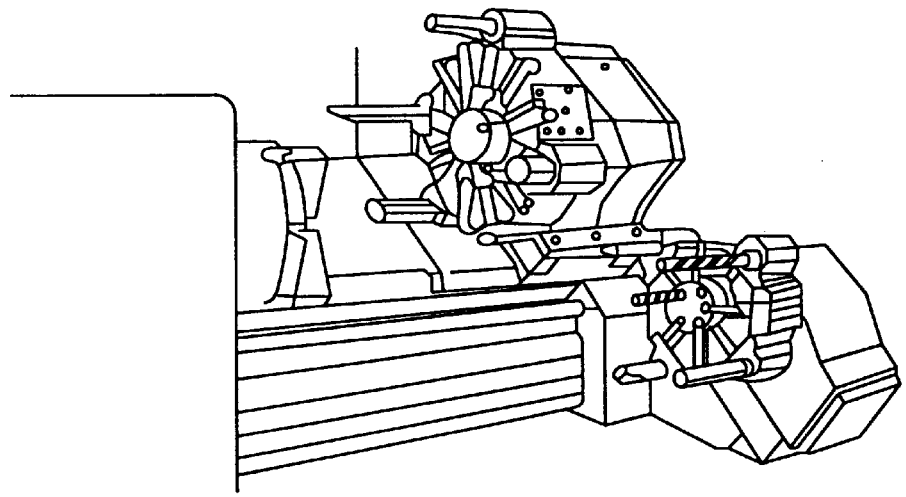
FIG. 3 illustrates an example of a CNC turn-mill center.
Figure 3B:
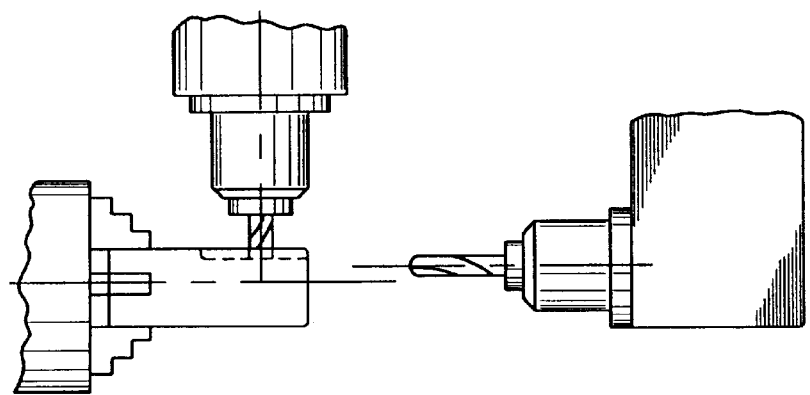

Column 3, lines 10–20:

The newest CNC Turn-Mill Machining Centers, shown for example in [FIG 3] *FIGS. 3A and 3B*, combine the capabilities of CNC milling, drilling, boring, and turning machines. A complex part having planar and curvilinear surfaces can be completely manufactured by one machine in one set-up. The Turn-Mill machine make parts with greater precision than other CNC machines because they eliminate the need to reposition the workpiece between turning and milling operations. The programming of these powerful machines, however, represents a significant challenge for the machine operators.

Column 4, lines 9–10:

[FIG. 1a and 1b] *FIGS. 1A and 1B* illustrate examples of [multi-axis] *a* CNC milling [machines] *machine*.

Figure 1C:
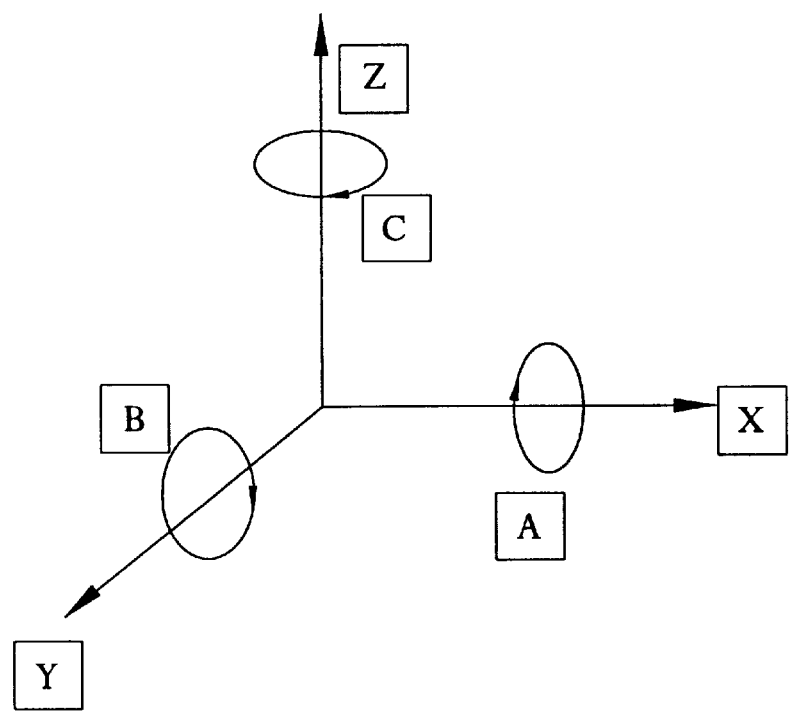
Figure 1D:
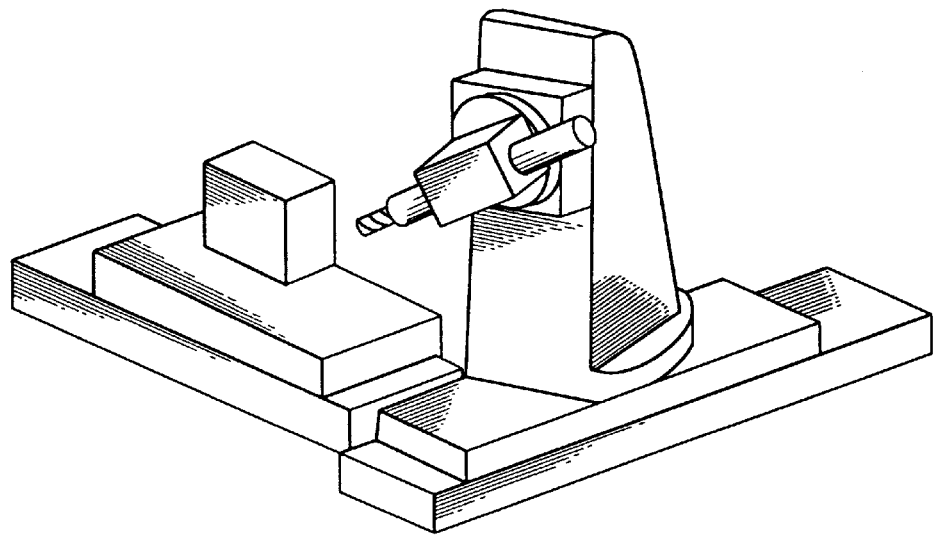

Column 4, add between lines 10 and 11:

*FIGS. 1C and 1D illustrate an example of a Multi-Axis CNC Machining Center.*

Column 4, lines 11–12:

[FIG. 2 illustrates an example] *FIGS. 2A and 2B illustrate examples* of [a] CNC [lathe with two tool turrets] *lathes*.

Column 4, line 13:

[FIG. 3 illustrates] *FIGS. 3A and 3B illustrate* an example of a CNC turn-mill center.

Figure 4B:
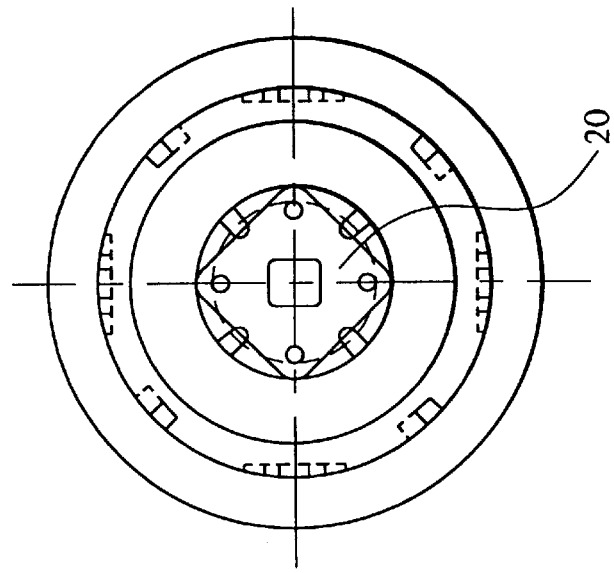
FIG. 4 illustrates an engineering drawing of a machinable part.
Figure 4A:
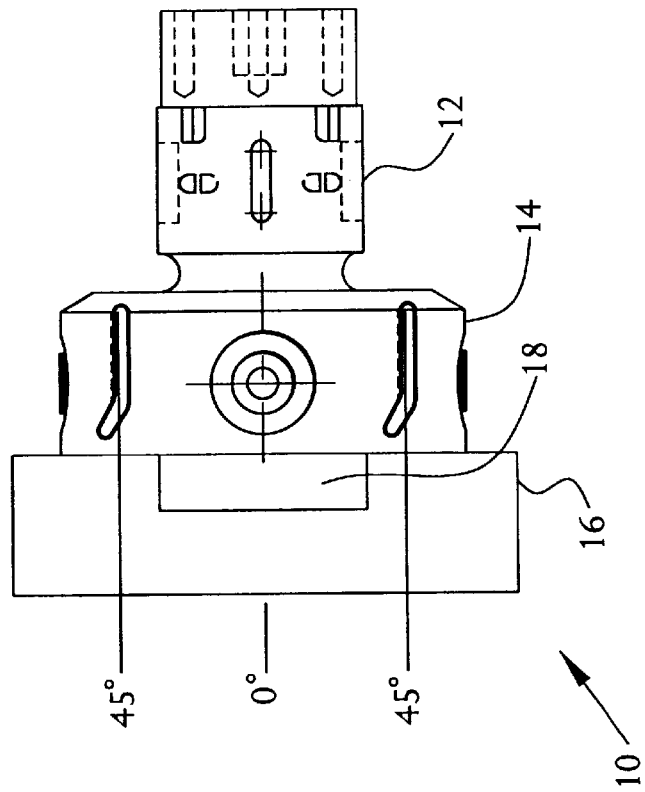

Column 4, lines 14–15:

[FIG. 4 illustrates] *FIGS. 4A and 4B illustrate* an engineering drawing of a machinable part.

Column 4, lines 18–19:

[FIG. 6 illustrates] *FIGS. 6A, 6B, and 6C illustrate* three examples of a window of a GUI for use with the present invention.

Column 4, lines 20–21:

[FIG. 7 illustrates] *FIGS. 7A, 7B, and 7C illustrate* three examples of another window of a GUI for use with the present invention.

Column 4, lines 25–26:

[FIG. 9 illustrates] *FIGS. 9A, 9B, and 9C illustrate* three example of another window of a GUI for use with the present invention.

Column 5, line 66–Column 6, line 34:

For each face 48, information defining a set of features associated with the face is input to the system using the GUI. Using the pull down menu system 44, the operator may open a cycles dialogue window 56, an example of which is illustrated in FIG. 8. The cycles dialogue window 56 enables the operator to define a cycle for machining a particular feature. A cycle is a set of operations for machining the particular feature. For example, the cycle illustrated in FIG. 8 includes four operations for creating a tapped, chamfered hole. The cycle parameter information includes the tooling, cutting path, and other operations information needed for machining a particular feature. The cycle includes an operation type, a canned cycle, a hole diameter, a hole depth, and a tool ID number. Using the cycles dialogue window 56 the operator may create a new cycle or gain access to the cycles database stored in the cycles database memory element 30 for retrieving a previously defined cycle. Each time a new cycle is defined it is stored in the cycles database for later use. A retrieved cycle can be reused or modified to create a new cycle. The cycles dialog window 56 displays the cycle parameter information using an easily modifiable table 60 with icons 62 of the tools used *in* the cycle. This facilitates quick and easy modification of existing cycles to create new cycles. Once the cycle has been defined, it is applied to the face 48 through which the particular cycles dialogue window 56 was opened and is illustrated in a work space 58 in the face window 42 using a graphic representation of face features (e.g., holes, slots, pockets, grooves, and threads). A cycle for machining each feature of a particular face must be applied to that face. A listing of all of the cycles for a particular face will appear in the work space 58. Each feature requires a cycle to machine that feature. A cycle record, including the cycle parameter information, is created for each new feature and the cycle record is stored in the datastore and associated with the appropriate face information.

Column 8, lines 10–20:

When machining curvilinear and planar surfaces on a single CNC turn-mill machine with a plurality of spindles and tool-holding turrets and cartridges, the post configuration subsystem 80 consists of two "forks." One fork contains a complete description of a CNC mill, and one fork contains a complete description of a CNC lathe. If the part, according to the manufacturing process, has to be produced on more than one CNC machine or on a multi-spindle machine capable of execution more than one CNC process, the code generation module [400] *40* may produce a plurality of CNC programs.

THE DRAWING FIGURES HAVE BEEN CHANGED AS FOLLOWS:

FIG. 6C; spelling correction ("boyonet").

FIG. 12; reference number 78 having been added to FIG. 2.

AS A RESULT OF REEXAMINATION, IT HAS BEEN DETERMINED THAT:

Claims 1 and 5 are determined to be patentable as amended.

Claims 2–4 and 6–9, dependent on an amended claim, are determined to be patentable.

New claims 10–34 are added and determined to be patentable.

1. A visual system for generating a CNC program to machine a part having planar and curvilinear surfaces and surfaces of revolution, comprising:
   a graphical user interface for inputting part information for defining a plurality of faces, each face corresponding to a surface of the part defined by the tool and work piece orientation, boundary, and type of machining function and being displayed in a separate computer window;
   a graphical user interface for inputting part information for defining a set of features associated with each of the plurality of faces;
   a graphical user interface for inputting part information for defining a set of machining operations and cutting tools associated with each element of [th] *the* set of features;
   a datastore memory element, in communication with the graphical user interface, that maintains a datastore for storing the part information;
   a process optimization module, in communication with the datastore memory element, for receiving the part information, the process optimization module including a memory element for maintaining a materials machineability database for selecting operational parameters for the set of machining operations and cutting tools and thereafter selectively ordering the set of machining operations; and
   code generation module, in communication with the process optimization module, that receives the ordered set of machining operations, the code generation module including a configuration graphical user interface subsystem for creating a configuration file and thereafter using the configuration file to convert the ordered set of machine operations into a CNC program for machining the part.

5. A method for generating a CNC program to machine a part having planar and curvilinear surfaces and surfaces of revolution, comprising the steps of:
   inputting part information defining a plurality of faces using a graphical user interface which includes computer windows, each face defined by the tool and work piece orientation, boundary, and type of machining *function* corresponding to a surface of the part and being input by means of a separate window;
   inputting using a graphical user interface information defining a set of operator selected part features associated with each of the plurality of faces;
   inputting using a graphical user interface information defining a set of operator defined machining operations and cutting tools associated with each element of the set of part features;
   storing the part faces and part features information in a datastore memory element;
   selectively ordering the set of machining operations using a materials machineability database; and
   converting the ordered set of machining operations into a CNC program for machining the part.

*10. A system for generating a CNC program as recited in claim 1 further comprising a graphical user interface for inputting and displaying tool information for defining a plurality of tools and their parameters.*

*11. A system for generating a CNC program as recited in claim 1 wherein the process optimization module groups the* machine operations by tools and wherein the selective ordering of the set of machining operations is based on such grouping.

12. A system for generating a CNC program as recited in claim 1 wherein the process optimization module further generates a graphical user interface showing a process table including the selectively ordered set of machining operations.

13. A system for generating a CNC program as recited in claim 12 wherein the graphical user interface for showing the selectively ordered set of machining operations permits a user to reorder the machine operations shown in the process table.

14. A method for generating a CNC program as recited in claim 5 further comprising the steps of inputting and displaying tool information for defining a plurality of tools and their parameters.

15. A method for generating a CNC program as recited in claim 5 wherein the step of selectively ordering the set of machining operations comprises grouping the machine operations by tools and wherein the selective ordering of the set of machining operations is based on such grouping.

16. A method for generating a CNC program as recited in claim 5 further comprising the step of generating a graphical user interface showing a process table showing the selectively ordered set of machining operations.

17. A method of generating a CNC program as recited in claim 16 further comprising the step of enabling a user to reorder the machine operations shown in the process table.

18. A visual system for generating a CNC program to machine a part having planar and curvilinear surfaces and surfaces of revolution, comprising:
    a graphical user interface for inputting part information for defining a plurality of faces corresponding to planar surfaces, curvilinear surfaces and surfaces of revolution of a part, each face corresponding to a surface of the part defined by the tool and work piece orientation, boundary and type of machining function and being displayed in a separate computer window;
    a graphical user interface for inputting part information for defining a set of features associated with each of the plurality of faces;
    a graphical user interface for inputting part information for defining a set of machining operations and cutting tools associated with each element of the set of features;
    a datastore memory element, in communication with the graphical user interface, that maintains a datastore for storing the part information;
    a process optimization module, in communication with the datastore memory element, for receiving the part information, the process optimization module including a memory element for maintaining a materials machineability database for selecting operational parameters for the set of machining operations and cutting tools and thereafter selectively ordering the set of machining operations; and
    code generation module, in communication with the process optimization module, that receives the ordered set of machining operations, the code generation module including a configuration graphical user interface subsystem for creating a configuration file and thereafter using the configuration file to convert the ordered set of machine operations into a CNC program for machining the part.

19. A system for generating a CNC program as recited in claim 18, further comprising a memory element for maintaining a cycles database for storing a plurality of cycle records, each record holding information for defining machining operations and cutting tools to machine a feature.

20. A system for generating a CNC program as recited in claim 18, further comprising a memory element for maintaining a tools database for storing a plurality of tools records, each record holding information for defining a tool available to the system.

21. A system for generating a CNC program as recited in claim 18, wherein the CNC program is for any one of a Turn-Mill, a Multi-Axis CNC Machining Center and a Multi-Axis Lathe.

22. A system for generating a CNC program as recited in claim 18 further comprising a graphical user interface for inputting and displaying tool information for defining a plurality of tools and their parameters.

23. A system for generating a CNC program as recited in claim 18 wherein the process optimization module groups the machine operations by tools and wherein the selective ordering of the set of machining operations is based on such grouping.

24. A system for generating a CNC program as recited in claim 18 wherein the process optimization module further generates a graphical user interface showing a process table including the selectively ordered set of machining operations.

25. A system for generating a CNC program as recited in claim 24 wherein the graphical user interface for showing the selectively ordered set of machining operations permits a user to reorder the machine operations shown in the process table.

26. A method for generating a CNC program to machine a part having planar and curvilinear surfaces and surfaces or revolution, comprising the steps of:
    inputting using a graphical user interface which includes computer windows part information defining a plurality of faces corresponding to surfaces of a part, wherein at least one of said surfaces is one of a curvilinear surface and a surface of revolution, each face defined by the tool and work piece orientation, boundary, and type of machining function corresponding to a surface of the part and being input by means of a separate window;
    inputting using a graphical user interface information defining a set of operator selected part features associated with each of the plurality of faces;
    inputting using a graphical user interface information defining a set of operator defined machining operations and cutting tools associated with each element of the set of part features;
    storing the part faces and part features information in a datastore memory element;
    selectively ordering the set of machining operations using a materials machineability database; and
    converting the ordered set of machining operations into a CNC program for machining the part.

27. A method for generating a CNC program as recited in claim 26, wherein the step of inputting the set of machinery operations includes creating cycle records in a cycle database, each cycle record holding information for defining machining operations and cutting tools to machine a part feature.

28. A method of generating a CNC program as recited in claim 26, wherein the step of selectively ordering the set of machining operations includes selecting an optimum tool

*cutting speed and feed rate for each element of the set of machining operations.*

*29. A method of generating a CNC program as recited in claim 26, wherein the step of converting the ordered set of machining operations into a CNC program includes customizing a configuration subsystem and thereby creating a machine specific configuration file.*

*30. A method of generating a CNC program as recited in claim 26, wherein the CNC program is for any one of a Turn-Mill, a Multi-Axis CNC Machining Center and a Multi-Axis Lathe.*

*31. A method for generating a CNC program as recited in claim 26 further comprising the steps of inputting and displaying tool information for defining a plurality of tools and their parameters.*

*32. A method for generating a CNC program as recited in claim 26 wherein the step of selectively ordering the set of machining operations comprises grouping the machine operations by tools and wherein the selective ordering of the set of machining operations is based on such grouping.*

*33. A method for generating a CNC program as recited in claim 26 further comprising the step of generating a graphical user interface showing a process table showing the selectively ordered set of machining operations.*

*34. A method of generating a CNC program as recited in claim 33 further comprising the step of enabling a user to reorder the machine operations shown in the process table.*

\* \* \* \* \*